(12) United States Patent
Fukuda et al.

(10) Patent No.: US 9,491,396 B2
(45) Date of Patent: Nov. 8, 2016

(54) APPARATUS, METHOD, AND SYSTEM OF CONTROLLING PROJECTION IMAGE, AND RECORDING MEDIUM STORING IMAGE PROJECTION CONTROL PROGRAM

(71) Applicants: Hiroaki Fukuda, Kanagawa (JP); Yohsuke Muramoto, Kanagawa (JP)

(72) Inventors: Hiroaki Fukuda, Kanagawa (JP); Yohsuke Muramoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/621,880

(22) Filed: Feb. 13, 2015

(65) Prior Publication Data

US 2015/0237293 A1 Aug. 20, 2015

(30) Foreign Application Priority Data

Feb. 14, 2014 (JP) .................................. 2014-026374
Jan. 21, 2015 (JP) .................................. 2015-009426

(51) Int. Cl.
*H04N 3/22* (2006.01)
*H04N 3/26* (2006.01)
*H04N 5/74* (2006.01)
*H04N 5/04* (2006.01)
*H04N 9/31* (2006.01)

(52) U.S. Cl.
CPC .............. *H04N 5/7458* (2013.01); *H04N 5/04* (2013.01); *H04N 9/3147* (2013.01)

(58) Field of Classification Search
CPC ........... H04N 9/31; H04N 7/15; H04N 7/152
USPC ....................................................... 348/745
See application file for complete search history.

(56) References Cited

U.S. PATENT DOCUMENTS

| | | | |
|---|---|---|---|
| 6,763,473 B1 | 7/2004 | Oteki et al. | |
| 6,862,101 B1 | 3/2005 | Miyazaki et al. | |
| 6,930,793 B1 | 8/2005 | Namizuka et al. | |
| 6,963,420 B1 | 11/2005 | Kawamoto et al. | |
| 7,072,058 B1 | 7/2006 | Miyazaki et al. | |
| 7,161,714 B1 | 1/2007 | Namizuka et al. | |
| 8,391,502 B2 * | 3/2013 | Mizoguchi ............... | H04N 5/60 381/306 |
| 8,553,904 B2 * | 10/2013 | Said ......................... | G01S 5/18 381/92 |
| 8,929,569 B2 * | 1/2015 | Wu .......................... | H04R 3/12 381/107 |
| 2001/0012113 A1 | 8/2001 | Yoshizawa et al. | |
| 2001/0012127 A1 | 8/2001 | Fukuda et al. | |
| 2001/0015821 A1 | 8/2001 | Namizuka et al. | |
| 2001/0019429 A1 | 9/2001 | Oteki et al. | |
| 2001/0021278 A1 | 9/2001 | Fukuda et al. | |
| 2001/0050778 A1 | 12/2001 | Fukuda et al. | |

(Continued)

FOREIGN PATENT DOCUMENTS

| | | |
|---|---|---|
| JP | 2005-196137 | 7/2005 |
| JP | 2007-057961 | 3/2007 |

(Continued)

*Primary Examiner* — Michael Lee
(74) *Attorney, Agent, or Firm* — Harness, Dickey & Pierce

(57) ABSTRACT

In response to receiving a sound signal representing sounds originated from a viewer for each one of a plurality of projectors, which are collected at each one of a plurality of microphones that are associated with the plurality of projectors, a projector control apparatus generates, for each one of the plurality of projectors, distance information indicating a distance of the viewer relative to the projector using the sound signal, and determines a layout of a projection image to be displayed by at least one of the plurality of projectors, based on the distance information of each one of the plurality of projectors.

17 Claims, 20 Drawing Sheets

(56) References Cited

U.S. PATENT DOCUMENTS

| | | |
|---|---|---|
| 2001/0054126 A1 | 12/2001 | Fukuda et al. |
| 2002/0012131 A1 | 1/2002 | Oteki et al. |
| 2002/0018244 A1 | 2/2002 | Namizuka et al. |
| 2002/0027670 A1 | 3/2002 | Takahashi et al. |
| 2003/0090742 A1 | 5/2003 | Fukuda et al. |
| 2003/0184808 A1 | 10/2003 | Fukuda et al. |
| 2004/0255175 A1 | 12/2004 | Oteki et al. |
| 2005/0031203 A1 | 2/2005 | Fukuda |
| 2005/0116968 A1 | 6/2005 | Barrus et al. |
| 2005/0157945 A1 | 7/2005 | Namizuka et al. |
| 2005/0237570 A1 | 10/2005 | Namizuka et al. |
| 2006/0028683 A1 | 2/2006 | Fukuda et al. |
| 2006/0028684 A1 | 2/2006 | Namizuka et al. |
| 2006/0061809 A1 | 3/2006 | Murataka et al. |
| 2006/0089133 A1 | 4/2006 | Yoshizawa et al. |
| 2007/0201060 A1 | 8/2007 | Fukuda |
| 2007/0300093 A1 | 12/2007 | Oteki et al. |
| 2008/0094647 A1 | 4/2008 | Takahashi et al. |
| 2009/0237686 A1 | 9/2009 | Yoshida et al. |
| 2009/0237714 A1 | 9/2009 | Fukuda et al. |
| 2010/0225735 A1* | 9/2010 | Shaffer ............... G06F 3/012 348/14.08 |
| 2010/0259610 A1* | 10/2010 | Petersen ............. G06Q 30/02 348/142 |
| 2013/0155437 A1 | 6/2013 | Muramoto |
| 2014/0204019 A1* | 7/2014 | Kihara ............... G06F 1/3231 345/156 |

FOREIGN PATENT DOCUMENTS

| | | |
|---|---|---|
| JP | 2012-014602 | 1/2012 |
| JP | 2014-174682 | 9/2014 |

* cited by examiner

FIG. 1
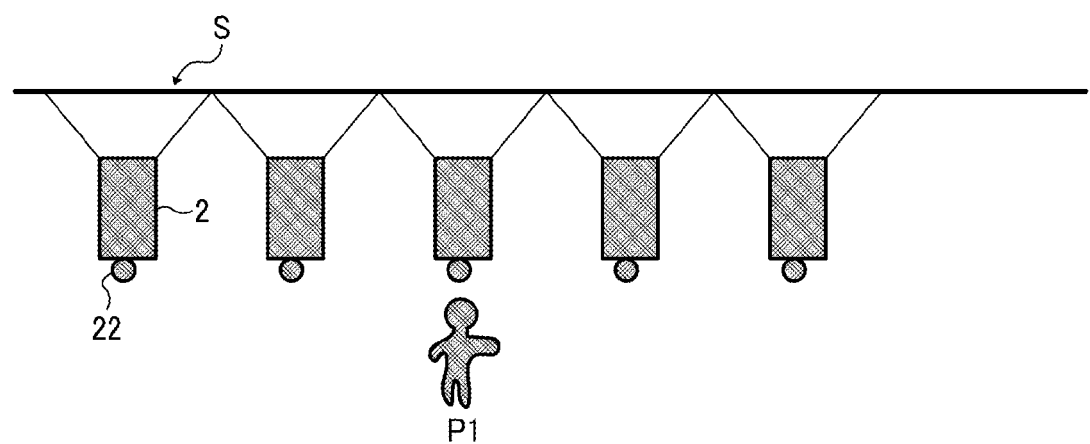
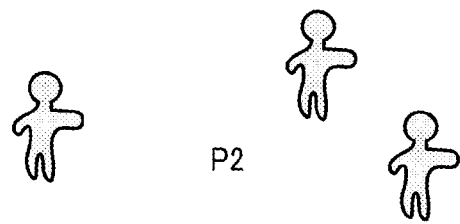

FIG. 11

| SOUND SOUDCE LOCATION (PASSENGER) | DISTANCE | DEGREE | PROJECTION IMAGE LAYOUT |
|---|---|---|---|
| (1) | FAR DISTANCE | FRONT OF PROJECTOR 202 | MULTI-PROJECTION BY PROJECTORS 201 TO 205 |
| (2) | NEAR DISTANCE | FRONT OF PROJECTOR 202 | PROJECTION BY PROJECTOR 202 |
| (3) | NEAR DISTANCE | BETWEEN PROJECTOR 202 AND PROJECTOR 203 | MULTI-PROJECTION BY PROJECTORS 202 AND 203 |
| (4) | FAR DISTANCE | BETWEEN PROJECTOR 202 AND PROJECTOR 203 | MULTI-PROJECTION BY PROJECTORS 201 TO 205 |

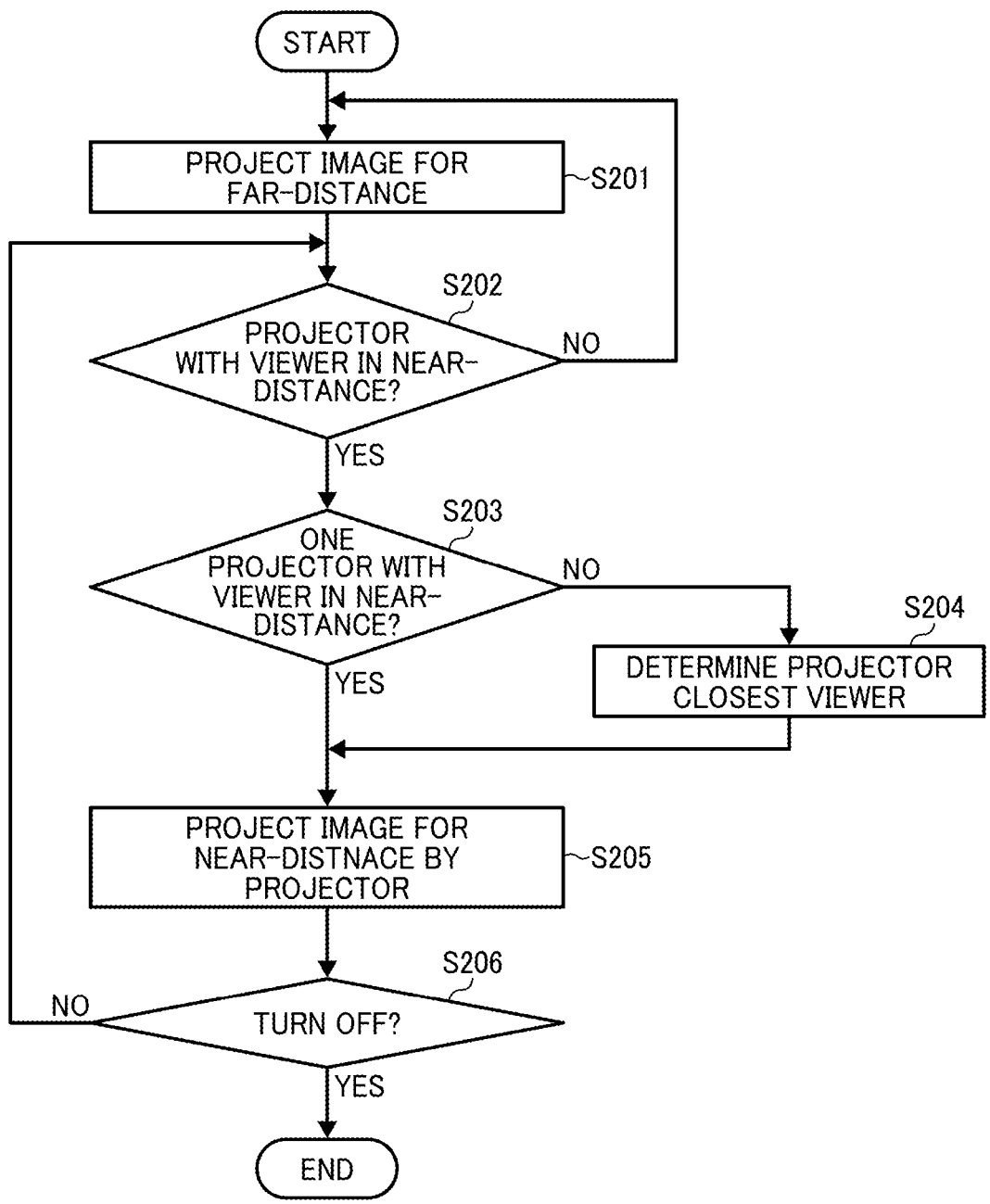

APPARATUS, METHOD, AND SYSTEM OF CONTROLLING PROJECTION IMAGE, AND RECORDING MEDIUM STORING IMAGE PROJECTION CONTROL PROGRAM

CROSS-REFERENCE TO RELATED APPLICATIONS

This patent application is based on and claims priority pursuant to 35 U.S.C. §119(a) to Japanese Patent Application Nos. 2014-026374, filed on Feb. 14, 2014, and 2015-009426, filed on Jan. 21, 2015, in the Japan Patent Office, the entire disclosure of which is hereby incorporated by reference herein.

BACKGROUND

Technical Field

The present invention generally relates to an apparatus, method, and system of controlling a projection image, and a projection image control program stored in a non-transitory recording medium.

Description of the Related Art

The recent multi-projection system provided with a plurality of projectors may operate as a digital signage, which displays an image on a screen through the projectors. In some cases, as illustrated in FIG. 20, the multi-projection system detects a location of a human, with a visible light camera or an infrared light camera on the projector, and switches a projector to display the image according to the detected location of the human. The camera, which is provided on each projector, usually has a blind spot due to its angle of view. For example, as illustrated in FIG. 20, as the human moves in between the cameras on the adjacent projectors, none of the cameras can detect the human presence, thus decreasing an accuracy in detection.

SUMMARY

In response to receiving a sound signal representing sounds originated from a viewer for each one of a plurality of projectors, which are collected at each one of a plurality of microphones that are associated with the plurality of projectors, a projector control apparatus generates, for each one of the plurality of projectors, distance information indicating a distance of the viewer relative to the projector using the sound signal, and determines a layout of a projection image to be displayed by at least one of the plurality of projectors, based on the distance information of each one of the plurality of projectors.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 1 is an illustration for explaining the positional relationship between a digital signage provided by a multi-projection system, and a viewer of the digital signage, according to an example embodiment of the present invention;

FIG. 11 is an illustration for explaining association information that associates a location of the sound source such as the viewer, a distance of the viewer to the projector, and an angle of the viewer to the projector, according to an example embodiment of the present invention;

FIG. 12 is a flowchart illustrating operation of controlling display of a projection image in the first scenario according to the first control method, performed by the projector control device, according to an example embodiment of the present invention;

Figure 2:
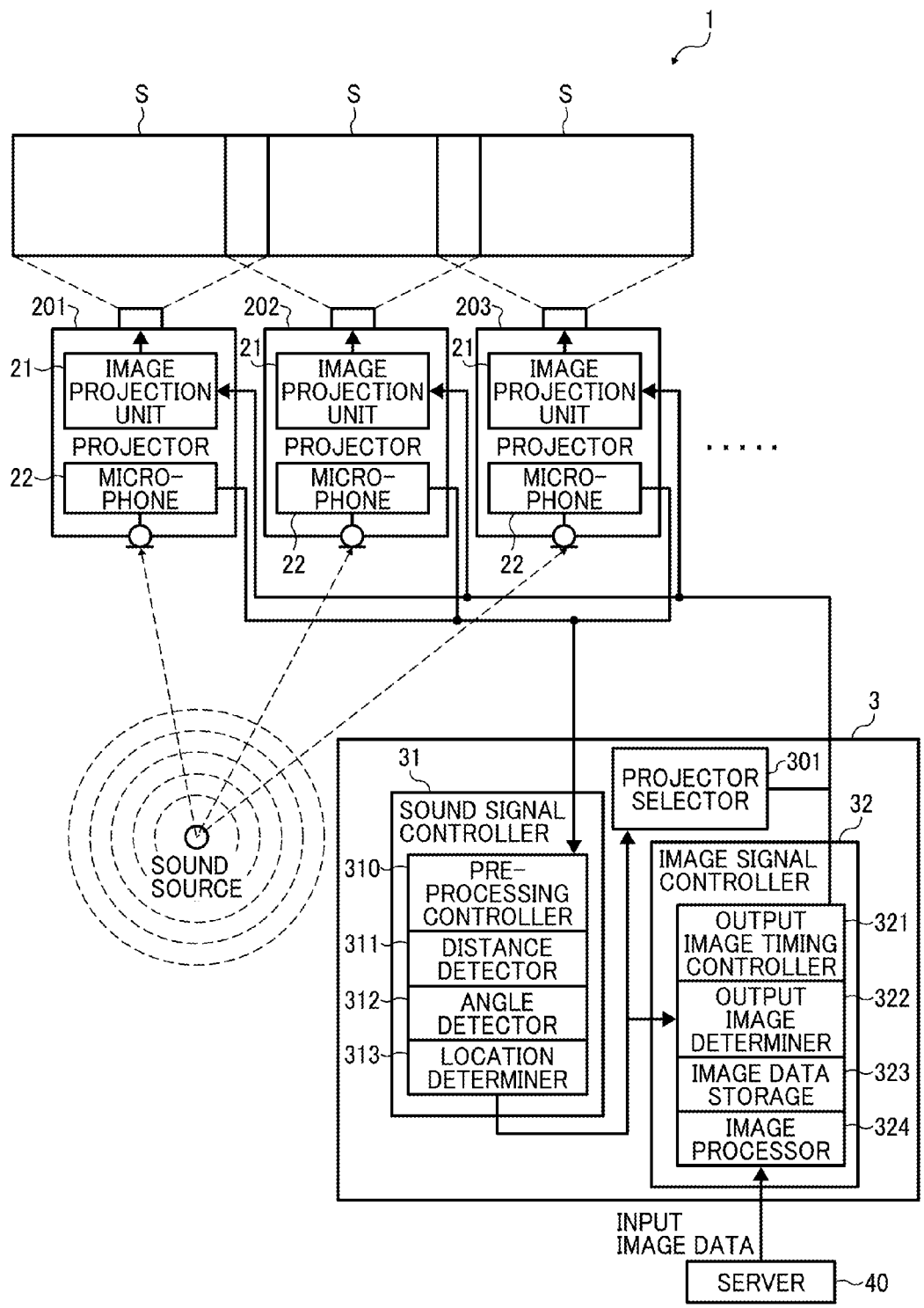
FIG. 2 is a schematic block diagram illustrating a configuration of the multi-projection system of FIG. 1.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Referring now to the drawings, a multi-projection system, which is one example of projection system capable of providing a digital signage, is described according to example embodiments of the present invention.

As illustrated in FIGS. 1 and 2, the multi-projection system 1 includes a plurality of projectors 2 (in this example, ultra-short throw projectors) that are arranged side by side at a predetermined distance, and a projector control device 3 capable of controlling each of the projectors 2 to display a projection image to a screen S for one or more viewers. FIG. 1 is an illustration for explaining the positional relationship between the projectors 2 in the multi-projection system 1 and one or more viewers. As described below, according to a location of the viewer, the projector control device 3 changes a layout of a projection image to be displayed on the screen S, for example, in terms of a number of images to be displayed by the system (the number of projectors to display), a display portion of the image to be displayed by each projector, etc.

In the following, the viewer is any person, who walks by or around any one of the projectors 2 of the multi-projection system 1, irrespective of whether the person is actually viewing the projection image. Further, the projector 22 in the multi-projection system 1 may be implemented in various ways, as long as each projector 22 is capable of detecting the human presence based on the sounds originated from the human (viewer). Further, the screen S may be any object capable of displaying thereon the projection image, such as a wall of any building, fog screen, etc. The number of screens is not limited to one, such that more than one screen may be used as a screen.

As illustrated in FIG. 1, for the viewers P2 who are far from the screen S, the projector control device 3 instructs the projectors 2 to display a plurality of projection images, respectively, such that the images are combined into one large projection image on the screen S. For the viewer P1 who is near the screen S, the projector control device 3 causes one projector 2 closest to the viewer P1 to display a projection image or some of the projectors 2 that are close to the viewer P1 to display projection images. Accordingly, the projector control device 3 changes a projector to display a projection image, according to the location of the viewer with respect to the projectors 2.

Further, the projector control device 2 may change a display portion of the projection image to be output by each projector 2, for example, when at least two projectors 2 display projection images. For example, assuming that each projector 2 is to output the same image, one projector 2 may be instructed to output a portion of the projection image, while the other projector 2 may be instructed to output the other portion of the projection image. The portions of the projection image are thus displayed on the screen S as a whole image, so as to be displayed in front of the viewer who is in between the projectors 2.

More specifically, as illustrated in FIG. 1, the projectors 2 are each provided with a microphone 22, such as a microphone array, to collect sounds from the surroundings. The multi-projection system 1 detects sounds originated from a human (viewer) such as voices or footsteps, and estimates the location of the viewer using the detected sounds. Based on the estimated location of the viewer, the multi-projection system 1 determines an image to be output, from among images that are available, for projection through at least one projector 2. As the location of the viewer changes, the multi-projection system 1 changes a layout of the image on the screen S, for example, by changing a projector to display a projection image or changing a display portion of the projection image.

Since the projection image to be displayed by each projector may be partially displayed according to the location of the viewer, content of the projection image may need to be generated so as to always include information to be delivered to the viewer in a manner that is not affected by the change in layout.

Further, in this example, it is assumed that the microphone 22 is provided on the projector 2. Alternatively, the microphone 22 or any device capable of collecting sounds may be provided separately from the projector 2, as long as the sound signal indicating the sound source (such as the viewer) can be generated for each one of the projectors 2.

FIG. 2 is a schematic block diagram illustrating a configuration of the multi-projection system 1 of FIG. 1, in particular, a module structure of the projector control device 3. Referring to FIG. 2, operation from collecting sounds to projecting an image is explained.

The multi-projection system 1 includes the screen S, the plurality of projectors 2 each capable of displaying a projection image, and the projector control device 3. The projector control device 3, which is electrically connected with each of the projectors 2 via a wired or wireless interface (I/F), controls display of the projection image by each projector 2. Further, in this disclosure, the plurality of projectors 2 include a projector 201, a projector 202, a projector 203, . . . , and a projector n, which may be collectively referred to as the projectors 2.

The plurality of projectors 2 are arranged side by side at a predetermined distance. The projector 2 includes an image projection unit 21 that displays a projection image, and a microphone 22 that collects sounds. The projector control device 3 includes a sound signal controller 31, an image signal controller 32, and a projector selector 301.

The sound signal controller 31 includes a pre-processing controller 310, a distance detector 311, an angle detector 312, and a location determiner 313. The image signal controller 32 includes an output image timing controller 321, an output image determiner 322, an image data storage 323, and an image processor 324.

The microphone 22 of the projector 2, which may be implemented by a microphone array, collects sounds and transmits the collected sounds in the form of sound signal to the projector control device 3 through the wired or wireless interface. The projector control device 3 receives the sound signal at the sound signal controller 31, from each of the projectors 2.

The pre-processing controller 310 of the sound signal controller 31 applies pre-processing to the input sound signal, such as noise removal. For example, the pre-processing controller 310 determines whether the input sound signal represents sounds originated from a human, that is, a sound source of the input sound signal is a human. When it is determined that the sound signal is not originated from a human, the pre-processing controller 310 determines such sounds as noise and determines not to detect a location of the sound source.

For example, frequency of the input sound signal is analyzed to determine whether sounds represented by the sound signal are originated from a human. More specifically, frequency components of the sound signal are generated via a time-frequency transform such as Fourier transform. The projector control device 3 previously stores different samples of frequency spectrum representing human voice, footsteps, etc. in a memory. The pre-processing controller 310 determines whether any frequency spectrum representing a human-originated sound is included in the input sound signal to determine whether the sound signal represents the human-originated sound. Analysis of the input sound signal to indicate whether the sounds are human-originated may be performed using any other desired known method. Further, the human-originated sounds are not limited to those representing the human voice or footsteps, such that any other types of sounds may be used to represent the human presence.

Assuming that the pre-processing controller 310 determines that the input sound signal represents the human-originated sound, the distance detector 311 generates a comparison result, which is used by the location determiner 313 to determine whether the sound source, that is, the human (viewer) is near the projector 2 or far from the projector 2, using a threshold sound pressure level. For example, when the sound signal from which noise is removed at the pre-processing controller 310 has a sound pressure level that is equal to or higher than the threshold sound pressure level, the location determiner 313 determines that the sound source is near distance such that the human (viewer) is located within a certain range from the projector 2.

The angle detector 312 detects an angle of the sound source with respect to the projector 2, based on the input sound signal that is collected at the microphone 22 of the projector 2, using a plurality of channels. In the example illustrated in FIG. 4, the projector 201 is closest to the sound source such that the sounds from the sound source reaches the microphone 22 of the projector 201 first. Since the projector 202 is second closest to the sound source, the sound from the sound source reaches the microphone 22 of the projector 202 after the sound reaches the projector 201. The sound from the sound source reaches the microphone 22 of the projector 203 after the sound reaches the projector 202. The angle detector 312 estimates an angle of the sound source with respect to the microphone 22 for each projector 2, using the difference in time (delay time) that the sound from the sound source reaches at each microphone 22.

The information indicating near distance or far distance, and the angle of the sound source with respect to each of the projectors 2, which are estimated by the distance detector 311 and the angle detector 312, respectively, are transmitted to the location determiner 313.

The location determiner 313 determines the positional relationship between the projector 2 and the sound source (human, that is, viewer), using information indicating the distance of the sound source to the projector 2 that is detected by the distance detector 311 and the angle of the sound source to the projector 2 that is detected by the angle detector 312. The location determiner 313 transmits the location information indicating the positional relationship of the sound source to each projector 2, to the output image determiner 322 of the image signal controller 32.

The image signal controller 32 receives input image data to be projected through the projector 2, from such as a personal computer (PC) or a server that stores the input image data.

The image processor 324 of the image signal controller 32 applies image correction to the input image data such as color correction or gamma correction.

The image data storage 323 temporarily stores processed image data that is processed by the image processor 324.

The projector selector 301 selects one or more projectors 2 to display a projection image, based on the location information indicating the positional relationship between the sound source and the projector 2.

The output image determiner 322 determines and generates a multi-projection image to be displayed through a plurality of projectors 2, based on the location information received from the sound signal controller 31. The location information indicates, for example, the distance of the sound source with respect to the projector 2.

For example, when the location information indicates that the viewer (sound source) is in front of the projector 201 within a certain range from the projector 201, the projector control device 3 causes the projector 201 to display a projection image. In another example, when the location information indicates that the viewer (sound source) is in between the projector 201 and the projector 202, the projector control device 2 causes the projector 201 and the projector 202 to together display a projection image while facing the viewer. In another example, when the location information indicates that the viewer (sound source) is far from the projectors 2 (projectors 201 to 203), the projector control device 2 causes the projectors 201, 202, and 203 to together display a projection image that is large in size on the screen.

The output image timing controller 321 controls timing to switch a layout of a multi-projection image generated by the output image determiner 322, using the location information such as the positional relationship, such as the distance, of the viewer (sound source) to the projector 2. For example, when the sound signal controller 31 detects any viewer, who is far from the projector 2, approaching near the projector 2, the output image determiner 322 changes such as a projector or a layout of the projection image according to the positional relationship indicating a distance and a direction (angle) of the viewer with respect to the projector 2. The output image timing controller 321 controls timing to switch a layout of a projection image generated by the output image determiner 322, for example, by changing a projector 2 to project the projection image or changing a display portion of the projection image.

The projectors 201 to 203 each project an image from the image projection unit 21 based on the received image data.

Figure 3:
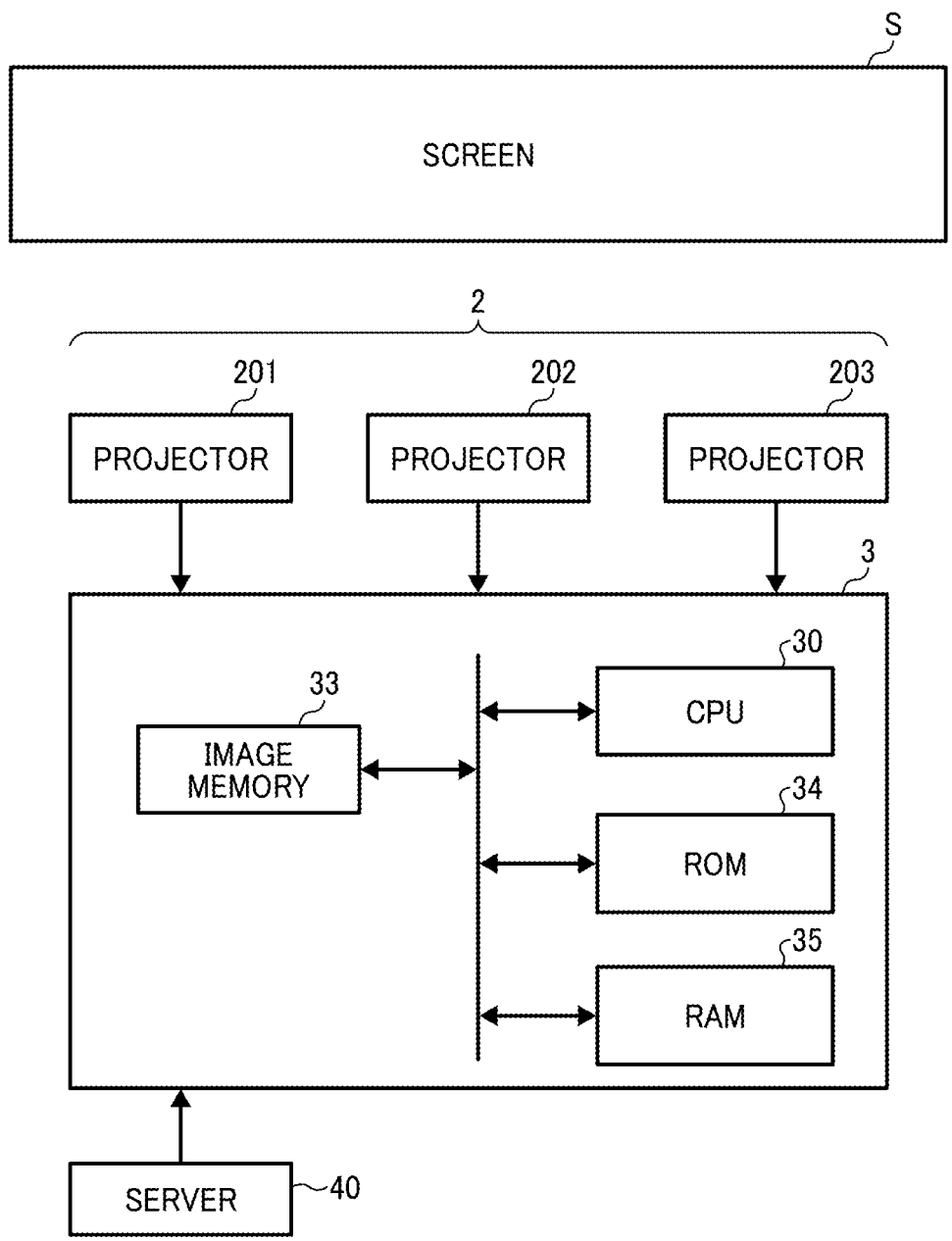
FIG. 3 is a schematic block diagram illustrating a hardware structure of a projector control device of the multi-projection system of FIG. 2.

Referring now to FIG. 3, a hardware structure of the projector control device 3 of the multi-projection system 1 is explained according to an example embodiment of the present invention.

The projector control device 3 includes a central processing unit (CPU) 30, a memory such as a read only memory (ROM) 34, a random access memory (RAM) 35, and an image memory 33, and an interface such as a network interface to communicate with each one of the projectors 2. The ROM 34 stores therein a control program that causes the CPU 30 to perform various functions as described above referring to FIG. 2. More specifically, the CPU 30 loads the control program from the ROM 34 onto the RAM 35 to function as the pre-processing controller 310, distance detector 311, angle detector 312, and location determiner 323 of the sound signal controller 31, as the output image timing controller 321, output image determiner 322, image data storage 323, and image processor 324 of the image signal controller 32, and as the projector selector 301. The image memory 33, which may be implemented by a non-volatile memory, for example, stores image data, such as image data input from the server 40 or image data that is generated by the CPU 30 functioning as the output image determiner 322.

In the following, operation of determining and generating a projection image, performed by the output image determiner 322 of the image signal controller 32, is explained according to embodiments of the present invention.

Figure 17:
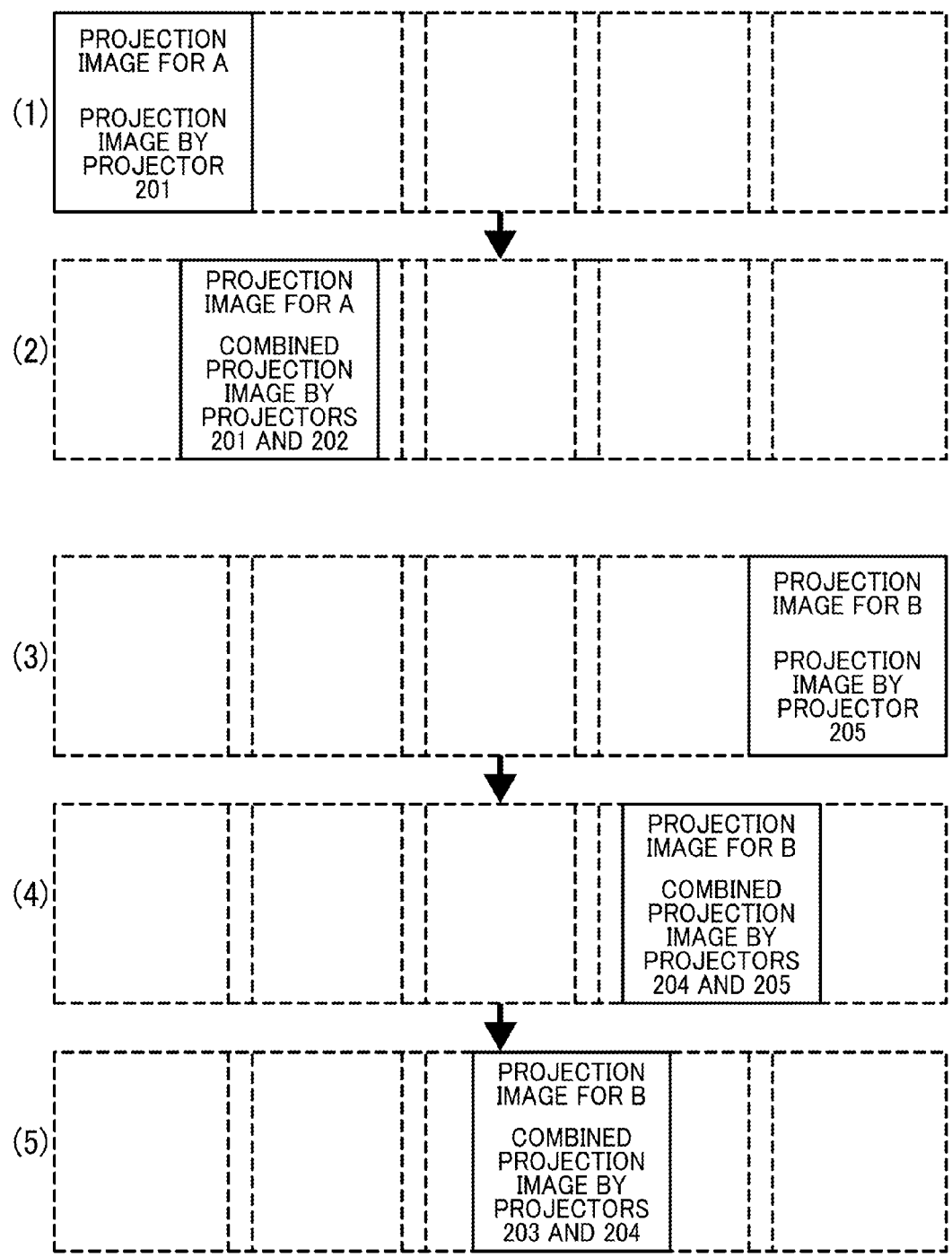
FIG. 17 is an illustration for explaining controlling of a projection image to be displayed by the multi-projection system in the second scenario, using a fifth control method.

In one example, the projector control device 3 stores two types of image in the image memory 33: the image for near distance (near-distance image) having a display size that can be projected by one projector; and the image for far distance (far-distance image) having a display size that can be projected by all of the projectors 2 (in this example, five projectors). In such case, the output image determiner 322 of the image signal controller 32 generates images other than the stored images as needed, based on the stored images, according to the detected location of the sound source (viewer). For example, in case of displaying a projection image for the viewer PA at (2) of FIG. 15, as illustrated in FIG. 17 (2), the projector control device 3 generates an image that corresponds to a left half portion of the near distance image to be displayed on the right side of the screen S, and a right half portion of the near distance image to be displayed on the left side of the screen S, and transmits the half-size near distance images to the projector 201 and the projector 202, respectively. The projector 201 and the projector 202 display the received half-sized images so as to display on the screen S as a combined projection image for the viewer PA.

In another example, the projector control device 3 stores a plurality of types of far-distance image each having a size that can be displayed by all projectors 2, in the image memory 33. For example, in the case of displaying the projection image as illustrated in FIG. 17, the projector control device 3 stores the images each having a size that can be displayed by the five projectors 2, in the image memory 33 as separate files. For example, in the case of displaying any type of image using these five projectors 2, the output image determiner 322 divides the image into five sections, and transmits each section of image to the corresponding projector 2, so as to display one projection image using the projectors 2.

Figure 10:
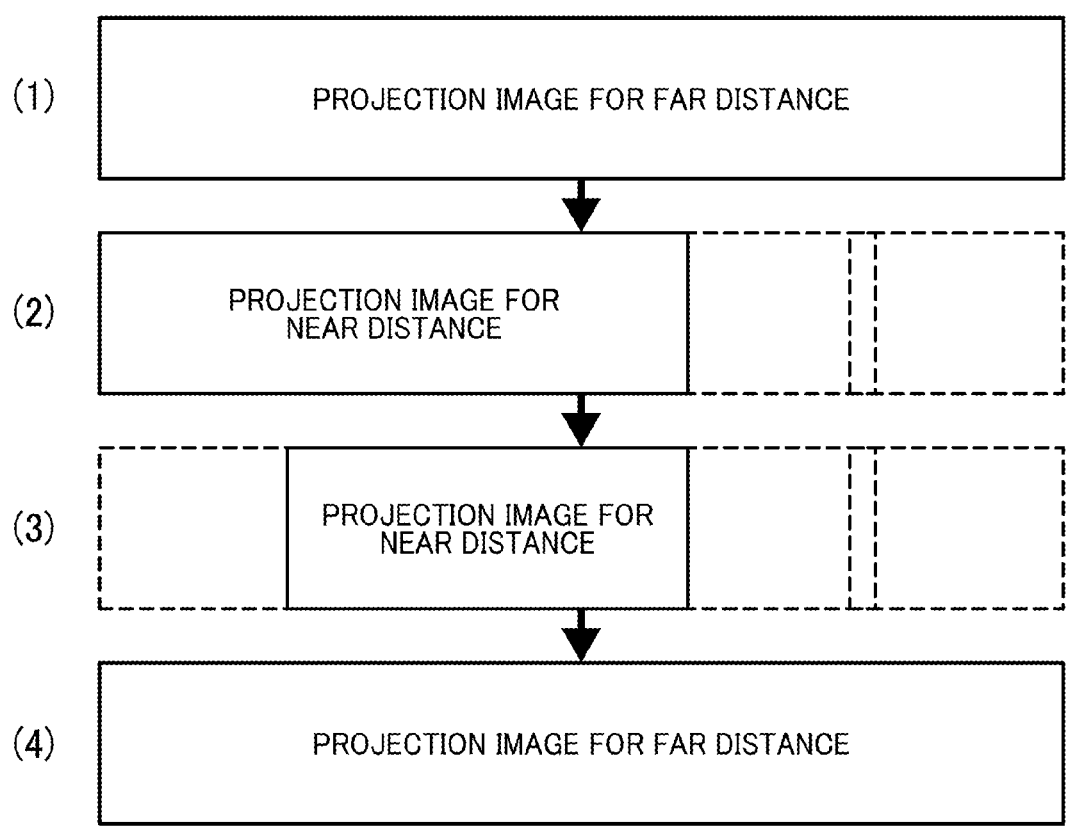
FIG. 10 is an illustration for explaining controlling of a projection image to be displayed by the multi-projection system in the first scenario, using a third control method.

In another example, the projector control device 3 stores a plurality of types of image that can be displayed by one projector, in the image memory 33. For example, the image memory 33 stores a near-distance image to be displayed using one projector as illustrated in FIG. 17 (1), a left half section of the near-distance image to be displayed at a right side of the screen as illustrated in FIG. 17 (2), a right half section of the near-distance image to be displayed at a left side of the screen as illustrated in FIG. 17 (2), five sections that are segmented from the far-distance image as illustrated in FIG. 10(1). In such case, the output image determiner 322 of the image signal controller 32 selects an image for projection from the image memory 33, without generating the projection image, and transmits the selected image to the selected projector 2.

Figure 4:
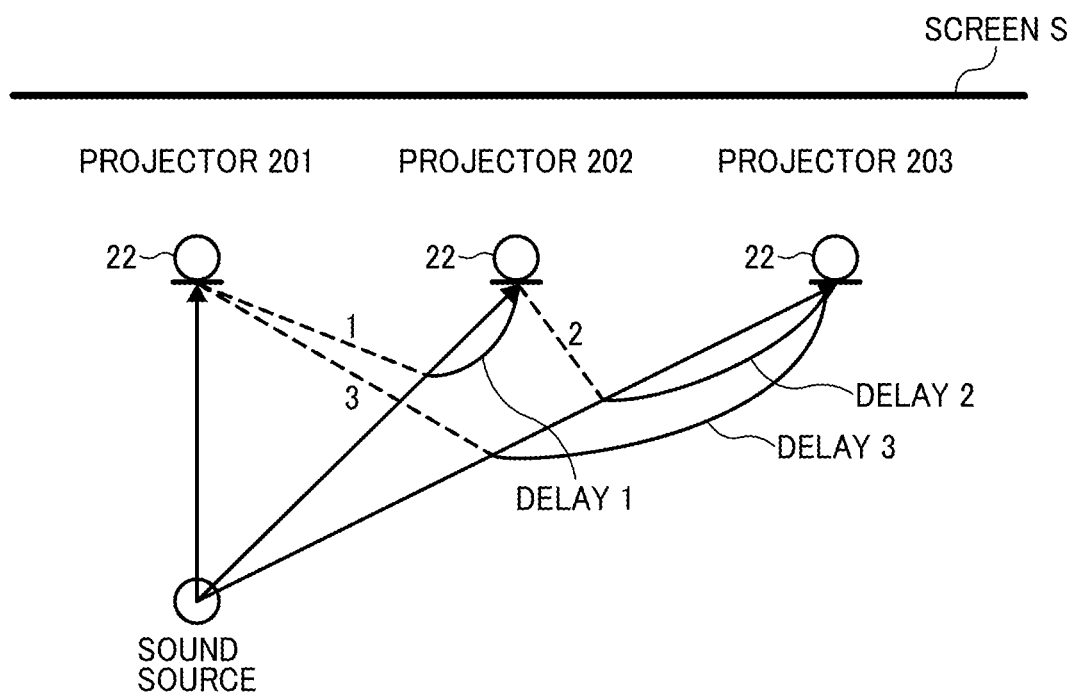
FIG. 4 is an illustration for explaining operation of determining a location of a sound source, according to an example embodiment of the present invention.

Referring now to FIG. 4, operation of determining the location of a sound source is explained, according to an example embodiment of the present invention.

The projectors 201 to 203 each collect sounds originated from the sound source (human, i.e, viewer) with the microphone 22, and output as the sound signal to the projector control device 3 as described above referring to FIG. 2. The projector control device 3 compares the sound pressure level with a predetermined sound pressure threshold, to determine whether the sound source is near distance or far distance from each of the projectors 2. The projector control device 3 further calculates a time difference between the time at which the sounds from the sound source reaches the microphone 22 of the projector 201, and the time at which the sounds from the sound source reaches the microphone 22 of the projector 202 to obtain a delay 1. Similarly, the projector control device 3 calculates a time difference between the time at which the sounds from the sound source reaches the microphone 22 of the projector 202, and the time at which the sounds from the sound source reaches the microphone 22 of the projector 203 to obtain a delay 2. Similarly, the projector control device 3 calculates a time difference between the time at which the sounds from the sound source reaches the microphone 22 of the projector 203, and the time at which the sounds from the sound source reaches the microphone 22 of the projector 201 to obtain a delay 3.

The location determiner 313 determines a positional relationship of the sound source relative to each of the projectors 201 to 203, based on the comparison result indicating whether sound source is near distance or far distance and the delay time of the sound source with respect to each of the projectors 201 to 203.

Figure 5:
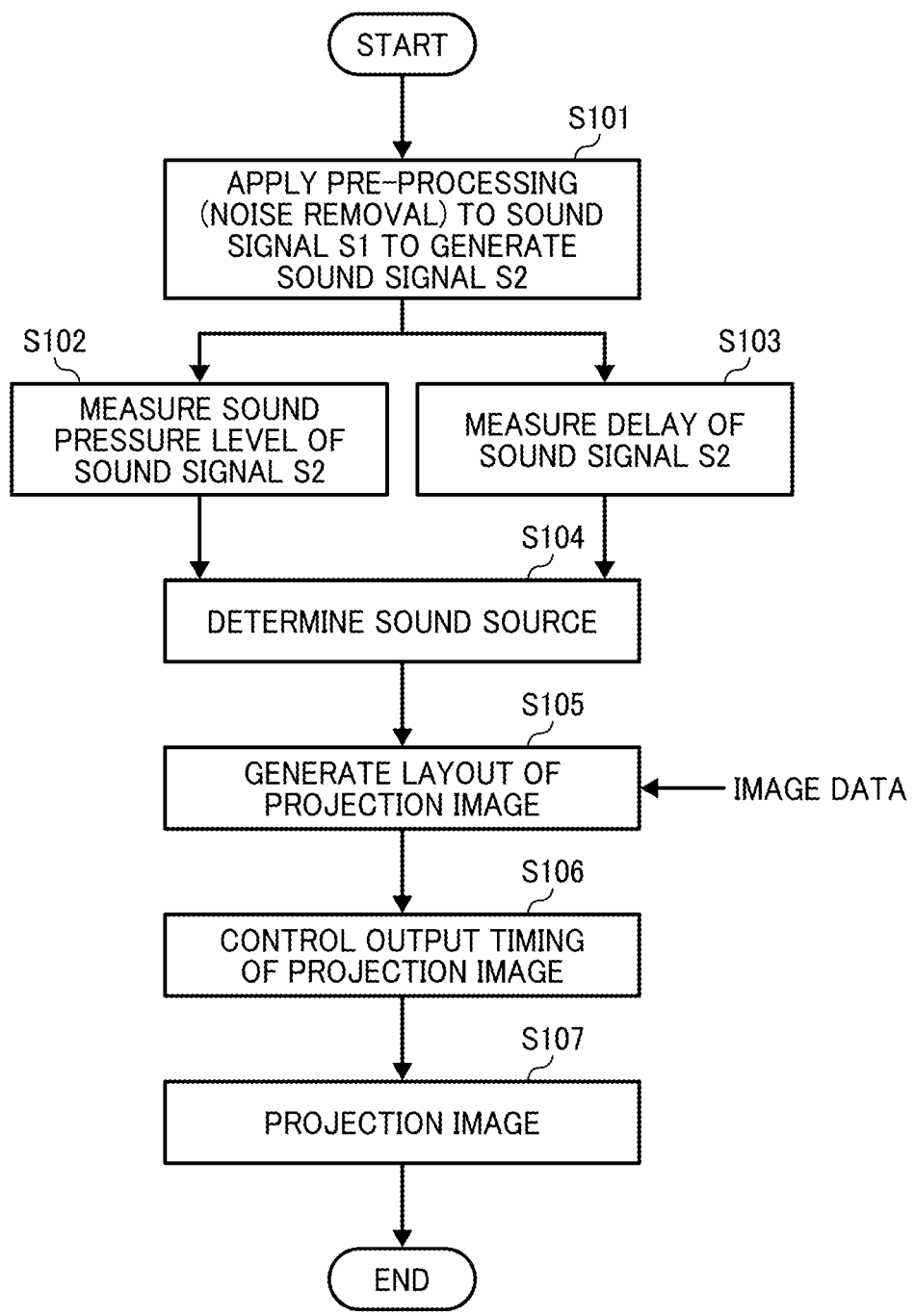
FIG. 5 is a flowchart illustrating operation of controlling a layout of a projection image to be displayed, performed by the projector control device of FIG. 3, according to an example embodiment of the present invention.

Referring now to FIG. 5, operation of controlling the layout of a projection image, performed by the CPU 30 of the projector control device 3, is explained according to an example embodiment of the present invention. The operation of FIG. 5 is performed for a sound signal S1 of sounds that are collected at the microphone 22 of each of the projectors 201 to 203.

At S101, the pre-processing controller 310 performs pre-processing, such as noise removal, to the sound signal S1 to generate a processed sound signal S2.

At S102, the distance detector 311 measures a sound pressure level of the processed sound signal S2, and compares the sound pressure level of the processed sound signal S2 with a predetermined sound pressure threshold to generate a comparison result indicating whether the processed sound signal is equal to or greater than the threshold. S101 and S102 are performed for each of the sound signals that are generated based on the microphones 22 of the projectors 201 to 203.

At S103, the angle detector 312 measures a delay time for the processed sound signal S2, relative to the processed sound signal S2 output from the other projector based on the sounds originated from the same sound source. S103 is performed concurrently with S102, for each of the sound signals that are generated based on the microphones 22 of the projectors 201 to 203. The sound pressure level and the delay time of the processed sound signal S2 are output to the location determiner 313.

At S104, the location determiner 313 determines a location of the sound source. In this example, the location determiner 313 determines whether the sound source is near distance or far distance, based on the comparison result performed for the sound pressure level of S102. The location determiner 313 further determines the location of the sound source relative to each one of the projectors 201 to 203, based on the delay time obtained at S103. More specifically, the location determiner 313 estimates a location of the sound source relative to the projectors 201 to 203 (projector 2), based on the sound pressure level and the delay time. The estimated location of the sound source is transmitted to the output image determiner 322, as the location information indicating the positional relationship of the sound source with the projector 2.

At S105, the output image determiner 322 generates a layout of a projection image based on a determination indicating whether the sound source is near distance or far distance, and a determination indicating the relative location of the projector 2 (projectors 201 to 203). The output image determiner 322 generates the projection image based on the determined layout.

At S106, the output image timing controller 321 controls a timing to output the projection image.

At S107, the projector selector 301 causes at least one of the projectors 2 to project the projection image on the screen S, according to the layout determined at S105 and the output timing as controlled by the output image timing controller 321, and the operation ends.

Figure 6:
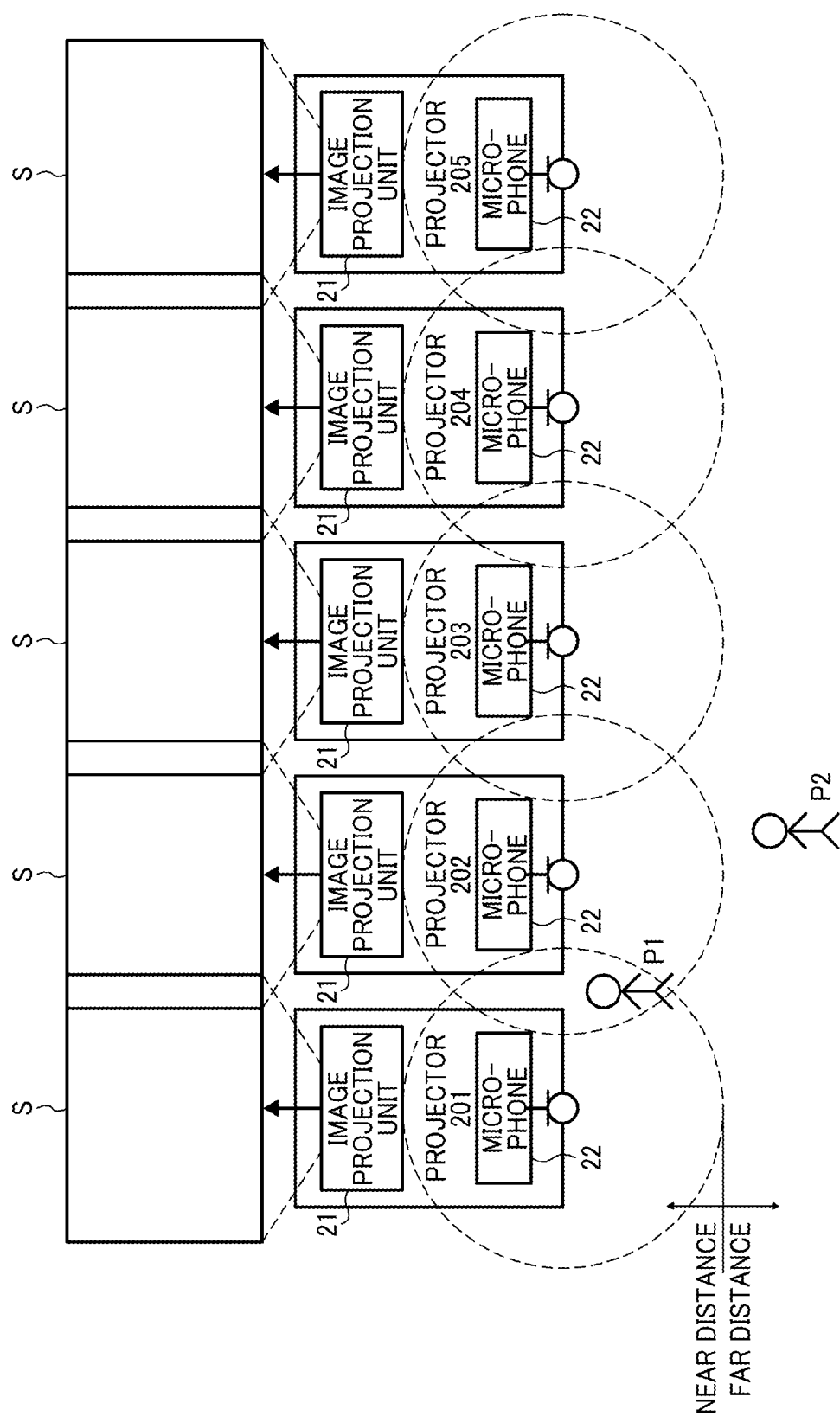
FIG. 6 is an illustration for explaining operation of estimating a distance between the sound source such as a viewer of the digital signage, and the projectors of the multi-projection system providing the digital signage.

FIG. 6 is an illustration for explaining operation of estimating a distance of the sound source, which is the viewer, and the projector 2 (each of the projectors 201 to 205), which is performed by the location determiner 313 of the projector control device 3.

When the viewer is near distance from the projector 2, the sound pressure level of the human-originated sounds, such as voice or footsteps, which are input through the microphone 22, tends to be higher compared to the case where the viewer is far distance. As described above, the location determiner 313 determines whether the viewer is near distance or far distance, based on comparison between the detected sound pressure level and a threshold of the sound pressure level. When the detected sound pressure level is equal to or greater than the sound pressure threshold, the location determiner 313 determines that the viewer is near distance. When the detected sound pressure level is less than the sound pressure level, the location determiner 313 determines that the viewer is far distance.

The plurality of projectors 201 to 205 that are arranged side by side are each provided with the microphone 22. The location determiner 313 determines that the viewer is near distance from at least one projector 2, when the sound pressure level of the sounds input through the microphone 22 of that projector 2 is equal to or higher than the pressure level threshold. The location determiner 313 determines that the viewer is not near distance, when the sound pressure level of the sounds input through the microphone 22 of the projector 2 is lower than the sound pressure threshold.

Figure 7:
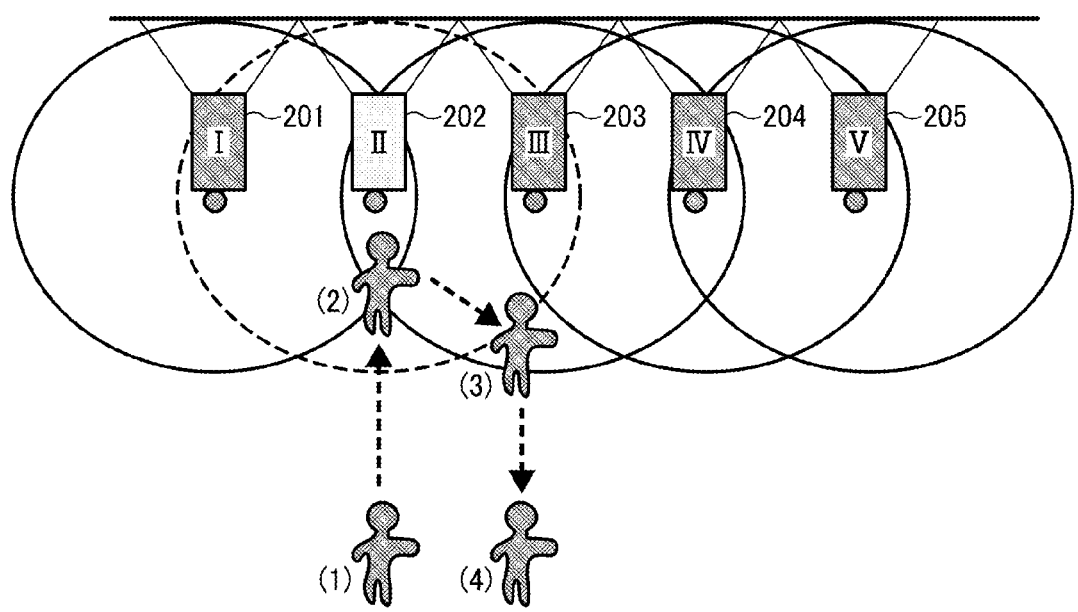
FIG. 7 is an illustration for explaining a travel path of the viewer according to a first scenario.
Figure 8:
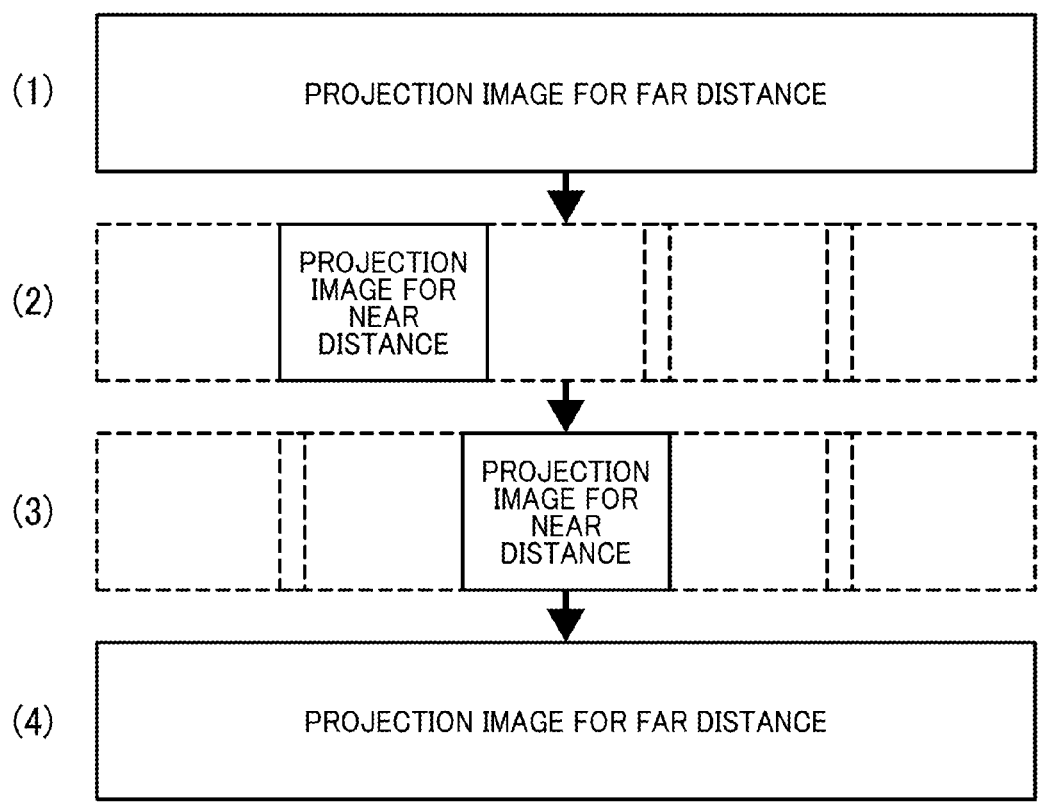
FIG. 8 is an illustration for explaining controlling of a projection image to be displayed by the multi-projection system in the first scenario, using a first control method.
Figure 9:
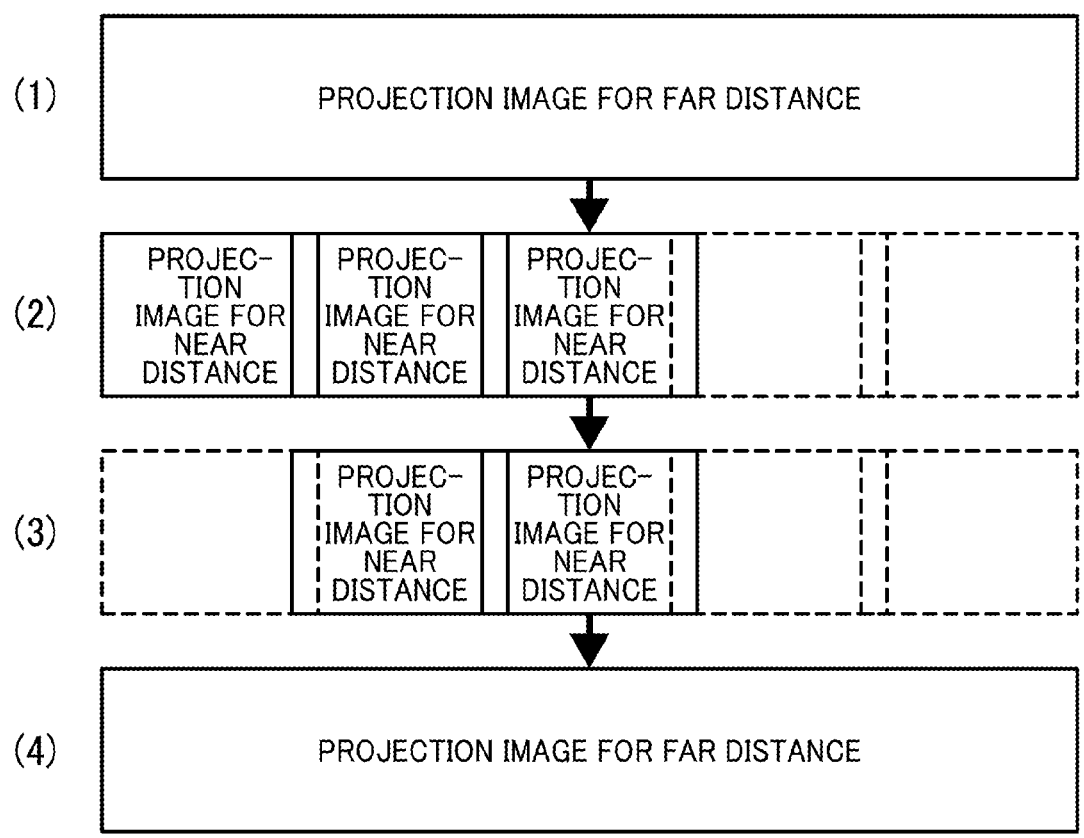
FIG. 9 is an illustration for explaining controlling of a projection image to be displayed by the multi-projection system in the first scenario, using a second control method.

FIG. 7 is an illustration for explaining a travel path of the viewer, according to the first scenario. In FIG. 7, the numerals (1) to (4) shown at left of the viewer represent that the viewer moves in from the locations (1) to (4). The circle of each projector 2 represents a boundary to determine whether the projector 2 is near distance or far distance. FIGS. 8 to 10 illustrate transition of images to be displayed on the screen S, as the viewer moves from (1) to (4), respectively, which is controlled using a first control method, a second control method, and a third control method. The numerals shown in FIGS. 8 to 10 correspond to the numerals (1) to (4) of FIG. 7.

Referring to FIG. 8, operation of controlling image projection in the first scenario using the first control method is explained according to an example embodiment of the present invention. In this example, one of the projectors 2 that is determined to be close to the viewer displays a projection image for near distance. Further, in this example, it is assumed that the projector control device 3 stores a near-distance image having a size that can be displayed by one projector, and a far-distance image having a size that can be displayed by all projectors.

When the viewer is located at (1) of FIG. 7, the viewer is not located near distance from any one of the projectors 201 to 205, such that the viewer is determined to be located far distance from the projectors 201 to 205. In such case, as illustrated in (1) of FIG. 8, the projectors 201 to 205 together display a projection image for far-distance on the screen S, such as one big image that may be generated by combining the projections images of the projectors 201 to 205.

When the viewer moves to (2) of FIG. 7, the viewer is located near distance from the projectors 201 to 203. However, since the projector 202 is closest to the viewer, as illustrated in (2) of FIG. 8, the projector selector 301 of the projector control device 3 selects the projector 202 to display a projection image for near distance. Further, in this example, it is assumed that the projector control device 3 stores a plurality of near-distance images each having a size that can be displayed by each projector.

When the viewer moves to (3) of FIG. 7, the projector 203 is closest to the viewer, such that the projector selector 301 of the projector control device 3 selects the projector 203 to display a projection image for near distance as illustrated in (3) of FIG. 8. More specifically, the projector selector 301 switches the projector 202 to the projector 203 to display the projection image.

When the viewer moves to (4) of FIG. 7, the viewer is not located near distance from any one of the projectors 201 to 205, such that the projectors 201 to 205 together display a projection image for far-distance on the screen S as illustrated in (4) of FIG. 8.

Referring to FIG. 9, operation of controlling image projection in the first scenario using the second control method is explained according to an example embodiment of the present invention. In this example, all of the projectors 2 that are determined as near from the viewer display projection images for near distance, respectively.

When the viewer is located at (1) or (4) of FIG. 7, the viewer is not located near distance from any one of the projectors 201 to 205, such that the projectors 201 to 205 together display a projection image for far-distance on the screen S, as illustrated in (1) or (4) of FIG. 9.

When the viewer moves to (2) of FIG. 7, the viewer is located near distance from the projectors 201, 202, and 203. In such case, as illustrated in (2) of FIG. 9, the projector selector 301 of the projector control device 3 selects the projectors 201, 202 and 203 to display projection images for near distance, respectively.

When the viewer is moves to (3) of FIG. 7, the viewer is located near distance from the projectors 202 and 203. In such case, as illustrated in (3) of FIG. 9, the projector selector 301 of the projector control device 3 selects the projectors 202 and 203 to display projection images for near distance, respectively.

Referring to FIG. 10, operation of controlling image projection in the first scenario using the third control method is explained according to an example embodiment of the present invention. In this example, all of the projectors 2 that are determined as near from the viewer together display a projection image. Further, in this example, it is assumed that the projector control device 3 combines images of projectors into one projection image, when displaying a projection image using more than one projector that is less than all projectors in number. Alternatively, the projector control device 3 may be previously stored with a large-size projection image to be displayed by more than one projector.

When the viewer is located at (1) or (4) of FIG. 7, the viewer is not located near distance from any one of the projectors 201 to 205, such that the projectors 201 to 205 together display a projection image for far-distance on the screen S as illustrated in (1) or (4) of FIG. 10.

When the viewer moves to (2) of FIG. 7, the viewer is located near distance from the projectors 201, 202, and 203. In such case, as illustrated in (2) of FIG. 10, the projector selector 301 of the projector control device 3 selects the projectors 201, 202, and 203 to together display a projection image, which is generated by combining the projection images of the projectors 201, 203, and 203 at the output image determiner 322.

When the viewer moves to (3) of FIG. 7, the viewer is located near distance from the projectors 202 and 203. The projector selector 301 of the projector control device 3 selects the projectors 202 and 203 to together display a projection image, which may be generated by combining the projection images of the projectors 202 and 203 at the output image determiner 322, as illustrated in (3) of FIG. 10.

FIG. 11 is an illustration for explaining association information that associates identification information for identifying location of a sound source (viewer), information indicating whether the sound source is near or far from the projector 2 (distance), an angle of the sound source with the projector 2, and layout of a projection image, which are obtained and stored in the above-described first scenario of FIG. 7. The association information may be temporarily stored in a memory of the projector control device 3. For simplicity, the distance and the angle of the sound source with respect to the projector 2 is referred to as location information. Referring to FIG. 11, timing to update the location information is described.

When the sound source (viewer) is located at (1) of FIG. 7, the sound pressure level of the sounds collected at the microphone 22 is relatively low, such as lower than the sound pressure threshold. In such case, the distances of the sound source for all of the projectors 201 to 205 are determined to be far distance. The angles of the sound source with respect to the projectors 201 to 205 indicate that the sound source is in front of the projector 202.

When the sound source (viewer) moves to (2) of FIG. 7, a part of the microphones 22 of the projectors 2 (in this example, the microphones 22 of the projectors 201 to 203) has the sound pressure level equal to or higher than the sound pressure threshold. Accordingly, the location determiner 313 determines that the distances to the part of the projectors 2 (projectors 201 to 203) are near distance. In this example, the angles of the sound source with respect to the projectors 201 to 203 indicate that the sound source is in front of the projector 202.

When the sound source (viewer) moves to (3) of FIG. 7, a part of the microphones 22 of the projectors 2 (in this example, the microphones 22 of the projectors 201 and 202) has the sound pressure level equal to or higher than the sound pressure threshold. Accordingly, the location determiner 313 determines that the distances to the part of the projectors 2 (projectors 202 and 203) are near distance. As the viewer moves in between the projector 202 and the projector 203, the angle detector 312 indicates that the sound source is in between the projector 202 and the projector 203, using the angles of the sound source with respect to the projectors 202 to 203.

When the sound source (viewer) moves to (4) of FIG. 7, the microphones 22 of the projectors 2 have the sound pressure levels lower than the sound pressure threshold, such that the distance of the sound source with respect to the projectors 201 to 205 is determined as far distance. The angles of the sound source with respect to the projectors 201 to 205 indicate that the sound source is in between the projector 202 and the projector 203.

Based on the location information as described above, the layout of the projection image to be projected for the viewer changes as follows.

When the viewer is located at (1) of FIG. 7, the viewer is located far distance. To help the viewer to easily see content of the projection image, the projectors 201 to 205 are selected to together display a projection image, that is, a multi-projection image.

When the viewer is located at (2) of FIG. 7, the viewer is located near distance in front of the projector 202. For the viewer who is located in front of the projector 202, the projector 202 alone displays a projection image, such as a near-distance projection image.

When the viewer is located at (3) of FIG. 7, the viewer is located near distance between the projector 202 and the projector 203. For the viewer, the projectors 202 and 203 together display a projection image, that is, a multi-projection image.

When the viewer is located at (4) of FIG. 7, the viewer is located far distance. To help the viewer to easily see content of the projection image, the projectors 201 to 205 are selected to together display a projection image, that is, a multi-projection image.

Figure 13:
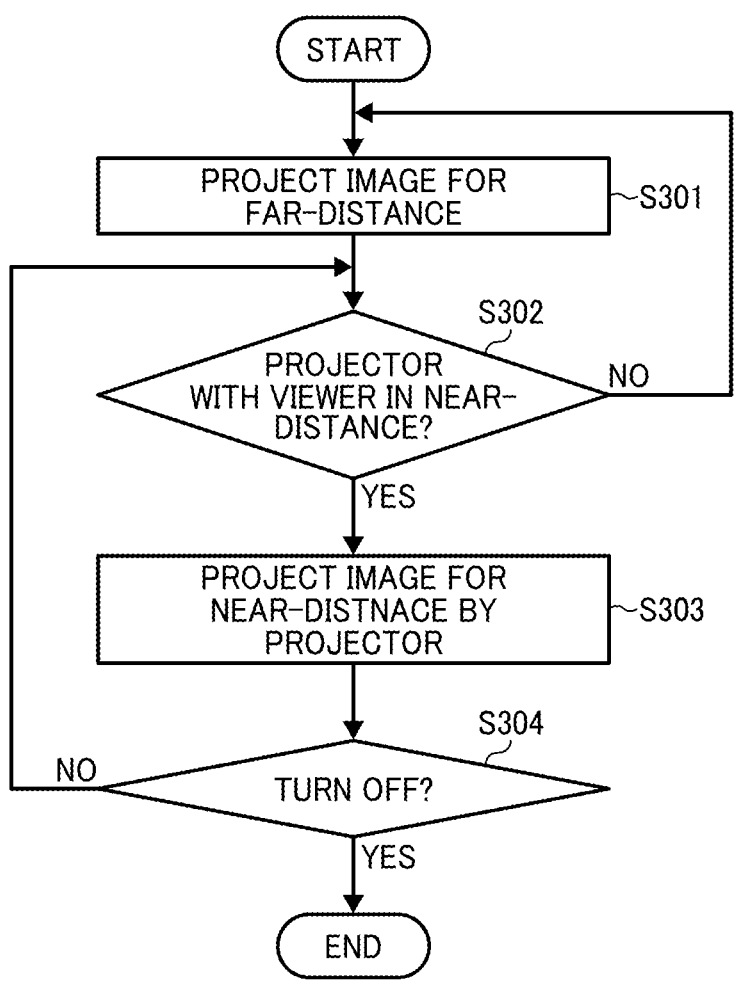
FIG. 13 is a flowchart illustrating operation of controlling display of a projection image in the first scenario according to the second control method, performed by the projector control device, according to an example embodiment of the present invention.
Figure 14:
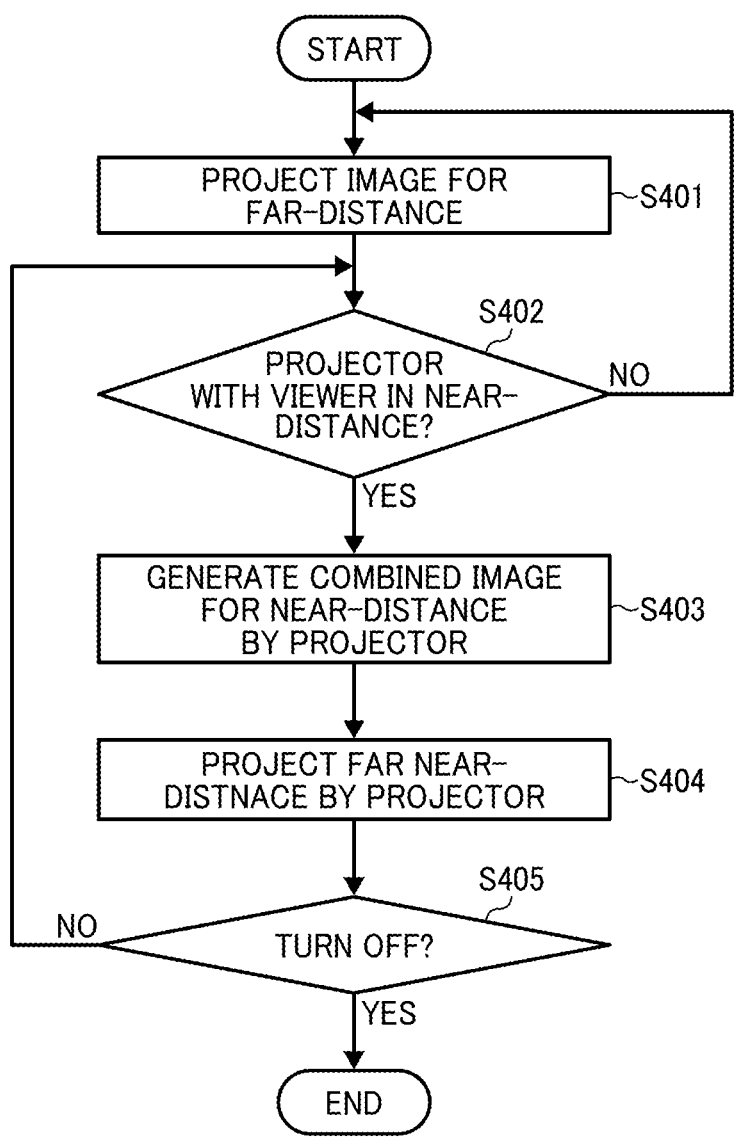
FIG. 14 is a flowchart illustrating operation of controlling display of a projection image in the first scenario according to the third control method, performed by the projector control device, according to an example embodiment of the present invention.

FIGS. 12 to 14 illustrate example operation of controlling image projection using the first control method, second control method, and third control method, respectively.

In the first control method illustrated in FIG. 12, S201 displays a projection image for far distance.

S202 determines whether there is any projector that is determined as having a viewer within its boundary. More specifically, the distance detector 311 of the sound signal controller 31 determines, for each one of the sound pressure levels of the sound signals that are collected at the microphones 22 of the projectors 2 (projectors 201, 202, . . . ), whether the sound pressure level of the sound signal is equal to or greater than the sound pressure threshold. When it is determined that the sound pressure level is equal to or greater than the sound pressure threshold for at least one of the projectors 2 ("YES" at S202), the operation proceeds to S203. When it is determined that there is no projector having a viewer within its boundary ("NO" at S202), the operation returns to S201.

At S203, the distance detector 411 of the sound signal controller 31 determines whether there is only one projector 2 having the sound signal with the sound pressure level that is equal to or greater than the threshold. When it is determined that there is more than one projector 2 having the sound signal with the sound pressure level that is equal to or greater than the threshold, that is, when there is more than one projector 2 that is near distance ("NO" at S203), the operation proceeds to S204.

At S204, the angle detector 312 of the sound signal controller 31 detects an angle of the sound source, that is, the viewer relative to each one of the projectors 2 (projectors 201, 202, etc.), using the time when the sound signal reaches the microphone 22 of each one of the projectors 2. Based on the detected angle, the location determiner 313 calculates a distance of the viewer with respect to each one of the projectors 2 to output location information. Based on the location information, the projection selector 301 selects one of the projectors 2 that is closest to the viewer.

At S205, the image signal controller 32 causes the selected projector 2 to display a projection image for near-distance.

When there is only one projector 2 that is near distance from the viewer at S203 ("YES" at S203), the operation proceeds to S205 to display a projection image for near-distance through the projector 2 that is near distance.

At S206, the projector control device 3 determines whether an instruction for turning off the power is received. When the instruction for turning off the power is received ("YES" at S206), the operation ends. Otherwise ("NO" at S206), the operation returns to S202.

S202 to S205 are repeated as long as the viewer's presence is detected. For example, referring to FIG. 7, as the viewer moves from (2) to (3), the projector control device 3 switches a projector 2 to display a projection image, from the projector 202 to the projector 203, when it is determined that the viewer is closest to the projector 203 based on the location information. More specifically, the projector 2 to display is switched based on the angle of the sound source with respect to the projector 2 that is detected by the angle detector 312.

In the second control method illustrated in FIG. 13, S301 displays a projection image for far distance.

S302 determines whether there is any projector that is determined as having a viewer within its boundary, in a substantially similar manner as described above referring to S202. When it is determined that the sound pressure level is equal to or greater than the sound pressure threshold for at least one of the projectors 2 ("YES" at S302), the operation proceeds to S303. When it is determined that there is no projector having a viewer within its boundary ("NO" at S302), the operation returns to S301.

At S303, the image signal controller 32 causes one or more projectors 2, which are near distance, to each display a projection image for near distance. S304 is performed in a substantially similar manner as described above referring to S206.

In the third control method illustrated in FIG. 14, S401 displays a projection image for far distance.

S402 determines whether there is any projector that is determined as having a viewer within its boundary, in a substantially similar manner as described above referring to S202. When it is determined that the sound pressure level is equal to or greater than the sound pressure threshold for at least one of the projectors 2 ("YES" at S402), the operation proceeds to S403. When it is determined that there is no projector having a viewer within its boundary ("NO" at S402), the operation returns to S401.

At S403, the output image determiner 322 combines a plurality of projection images into one large-size image for display by the near-distance projectors 2.

At S404, the image signal controller 32 causes one or more projectors 2, which are near distance, to together display the combined projection image. S405 is performed in a substantially similar manner as described above referring to S206.

In the above-described example, when there is only one projector that is near distance, the projector control device 3 may cause that projector to display a projection image for near distance. In such case, S403 of combining is not performed.

Further, in alternative to performing S403 of combining the images, the projector control device 3 may previously store a plurality of types of projection images each having a different size that corresponds to the number of projectors to be selected. In such case, the projector control device 3 selects a projection image to be output, according to the number of projectors to display.

Figure 15:
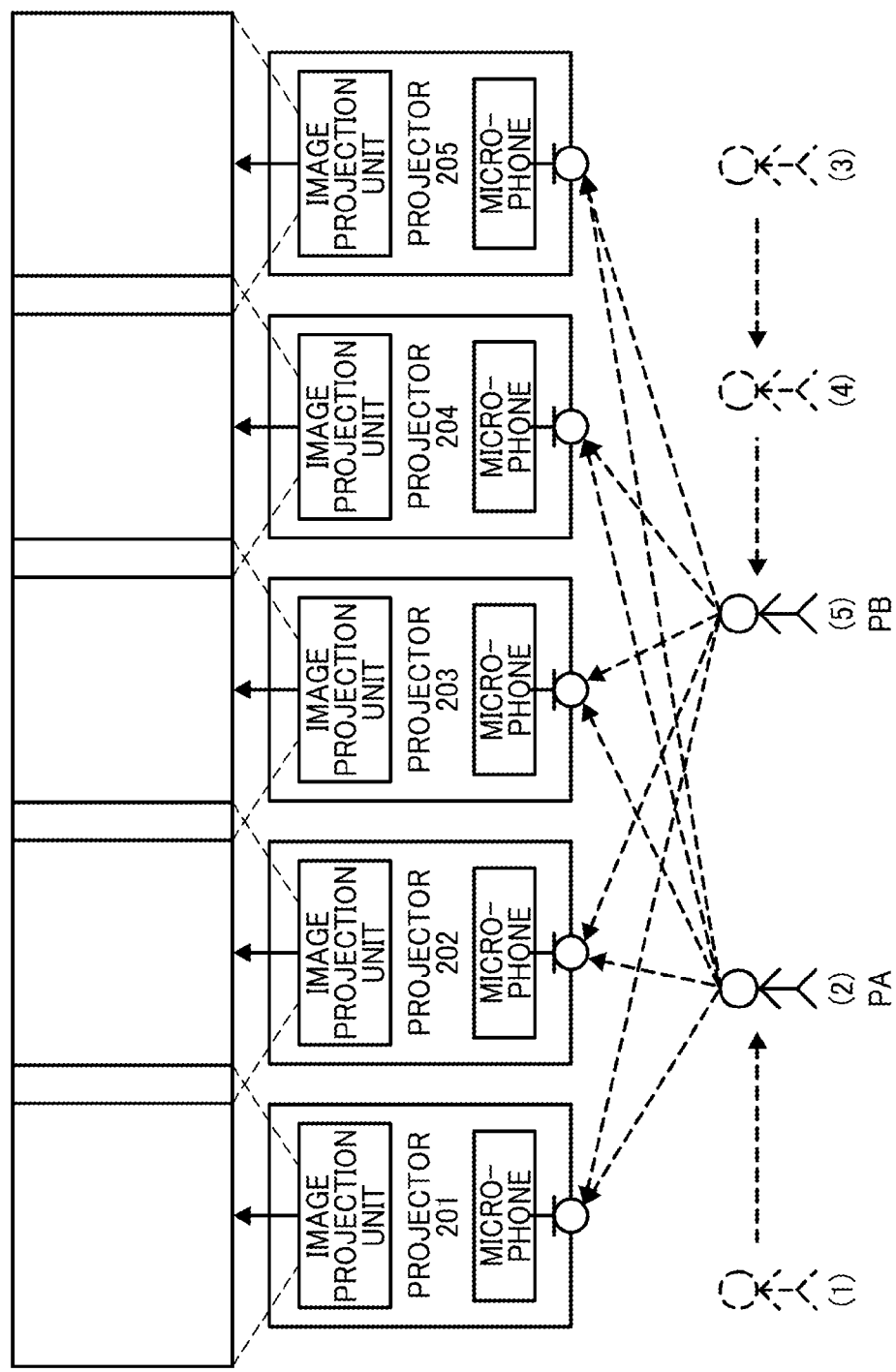
FIG. 15 is an illustration for explaining a travel path of the viewer according to a second scenario.
Figure 16:
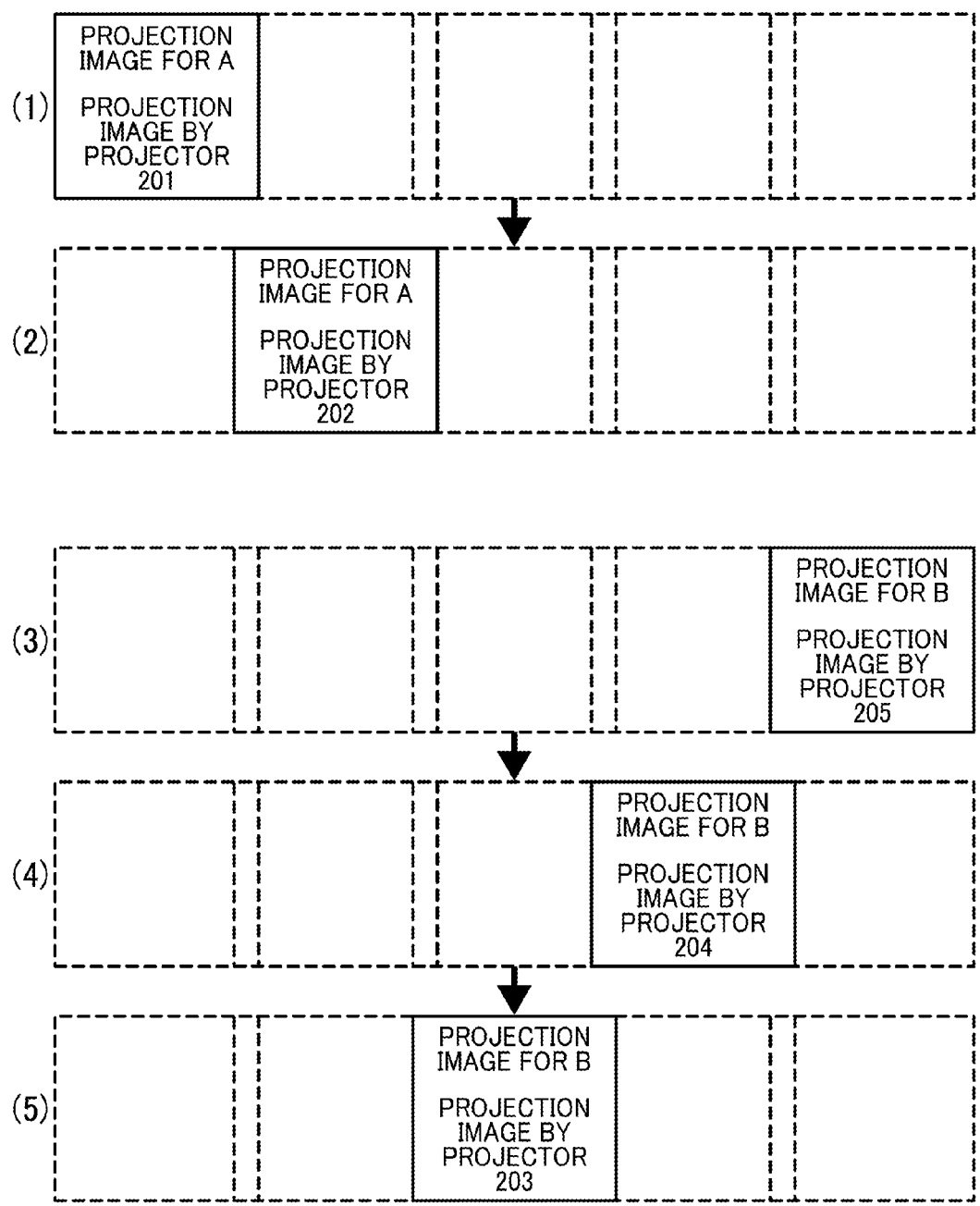
FIG. 16 is an illustration for explaining controlling of a projection image to be displayed by the multi-projection system in the second scenario, using a fourth control method.

FIG. 15 is an illustration for explaining a travel path of the viewer, according to the second scenario. FIGS. 16 and 17 illustrate transition of images to be displayed on the screen S, as the viewer moves from (1) to (4), respectively, as controlled using a fourth control method and a fifth control method.

In FIG. 15, it is assumed that two viewers PA and PB are present near the projectors 2 (projectors 201 to 205). The viewer PA moves from the location (1) to (2), and the viewer PB moves from the location (3) to (4). In this example, the microphones 22 of the projectors 2 collect human-originated sounds such as voice or footsteps to output sound signals. Using the sound signals, the projector control device 2 estimates a travel path and a travel speed of each of the viewers PA and PB.

Referring to FIG. 16, operation of controlling image projection in the second scenario using the fourth control method is explained according to an example embodiment of the present invention.

In this example, it is assumed that the viewer PA, who is located at (1), travels from (1) toward (2). When the viewer PA is located at (1), the projector 201 that is closest to the viewer PA displays a projection image that is generated for the viewer PA ("projection image for A"). As the viewer PA continues to move toward (2), such that the projector 202 becomes closest to the viewer PA, the projector selector 301 of the projector control device 3 switches from the projector 201 to the projector 202, as the projector 2 to display the projection image for A at timing under control of the output image timing controller 321.

It is assumed that the viewer PB, who is located at (3), travels from (3) toward (4). When the viewer PB is located at (3), the projector 205 that is closest to the viewer PB displays a projection image that is generated for the viewer PB ("projection image for B"). As the viewer PB continues to move toward (4), such that the projector 204 becomes closest to the viewer PB, the projector selector 301 of the projector control device 3 switches from the projector 205 to the projector 204, as the projector 2 to display the projection image for B at timing under control of the output image timing controller 321.

As the viewer PB travels from (4) to (5), such that the projector 203 becomes closest to the viewer PB, the projector selector 301 of the projector control device 3 switches from the projector 204 to the projector 203, as the projector 2 to display the projection image for B at timing under control of the output image timing controller 321.

Referring to FIG. 17, operation of controlling image projection in the second scenario using the fifth control method is explained according to an example embodiment of the present invention.

In this example, it is assumed that the viewer PA, who is located at (1), travels from (1) toward (2). When the viewer PA is located at (1), the projector 201 that is closest to the viewer PA displays a projection image for A. As the viewer PA continues to move toward (2), the projector control device 3 switches, from display of the projection image for A by the projector 201, to display of the combined projection image by the projectors 201 and 202. In this example, the projector control device 2 controls the projectors 2 so as to continuously change a location of the projection image being displayed on the screen S according to the travel speed of the viewer PA. Accordingly, the projection image to be displayed by the projectors 201 and 202 is a projection image for A.

It is assumed that the viewer PB, who is located at (3), travels from (3) toward (4). When the viewer PB is located at (3), the projector 205 that is closest to the viewer PB displays a projection image for B. As the viewer PB continues to move toward (4), the projector control device 3 switches, from display of the projection image for B by the projector 205, to display of the combined projection image by the projectors 204 and 205. In this example, the projector control device 3 controls the projectors 2 so as to continuously change a location of the projection image being displayed on the screen S, according to the travel speed of the viewer PB. Accordingly, the projection image to be displayed by the projectors 204 and 205 is a projection image for B.

When the viewer PB moves from (4) to (5), the projector control device 3 switches display of the projection image for B, from the combined projection image by the projectors 204 and 205, to the combined projection image by the projectors 203 and 204. More specifically, the projector control device 3 controls the projectors 2 so as to continuously change a location of the projection image being displayed on the screen S, according to the travel speed of the viewer PB.

Figure 18:
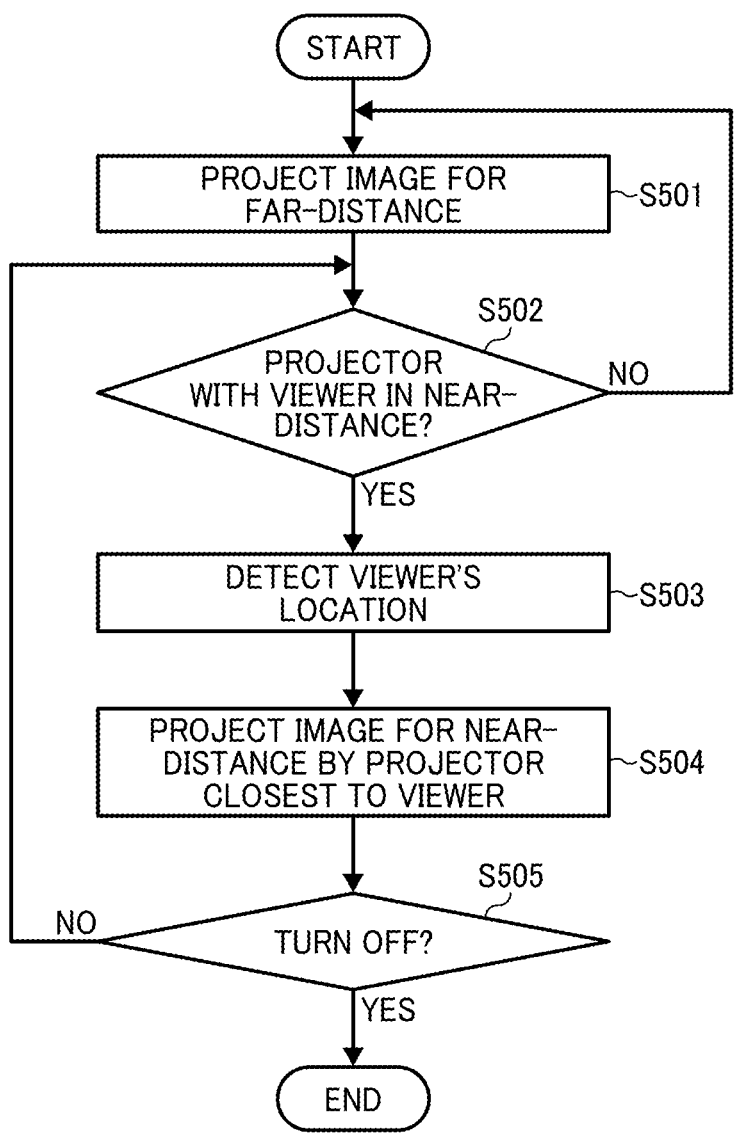
FIG. 18 is a flowchart illustrating operation of controlling display of a projection image in the second scenario according to the fourth control method, performed by the projector control device, according to an example embodiment of the present invention.
Figure 19:
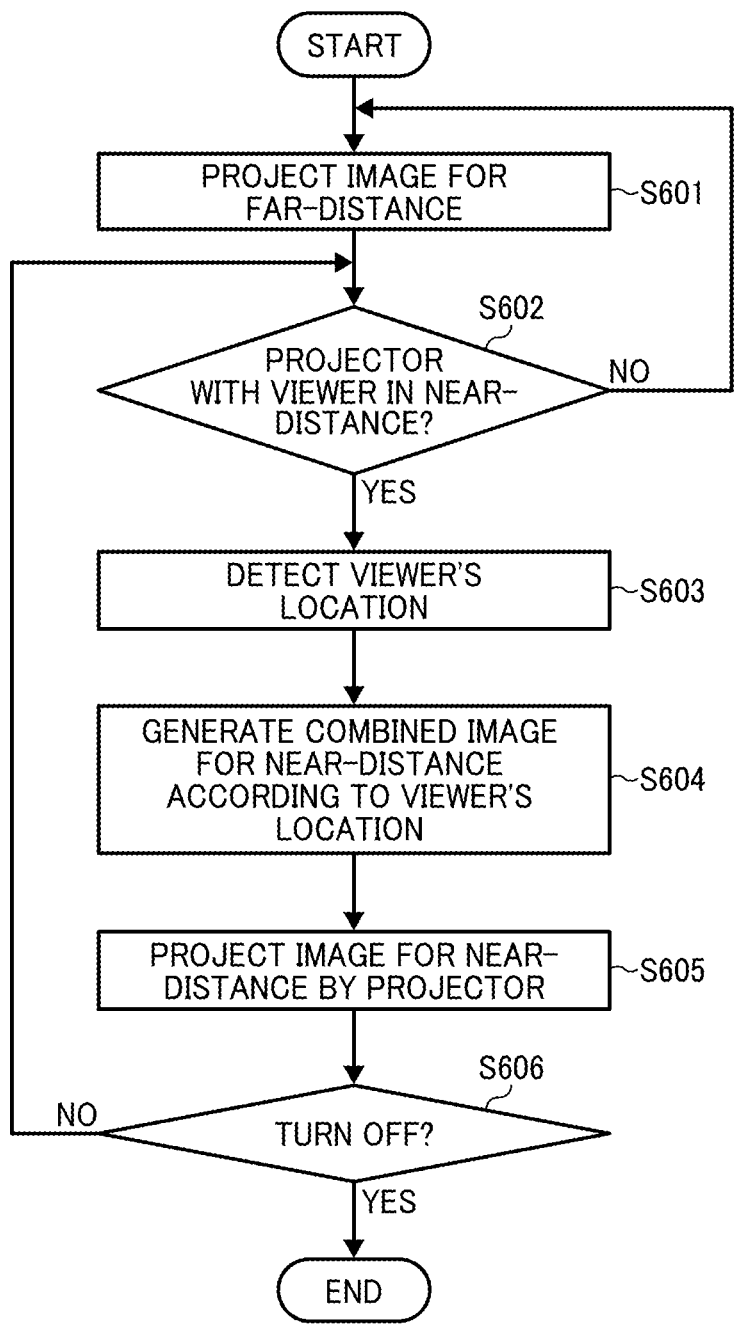
FIG. 19 is a flowchart illustrating operation of controlling display of a projection image in the second scenario according to the fifth control method, performed by the projector control device, according to an example embodiment of the present invention.
Figure 20:
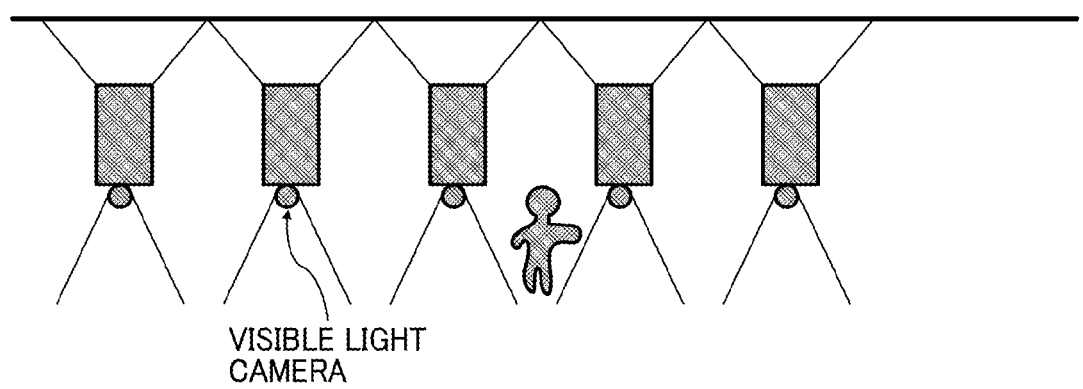
FIG. 20 is an illustration of a configuration of a multi-projection system, according to the background art.

FIGS. 18 and 19 illustrate example operation of controlling image projection using the fourth control method and the fifth control method, respectively.

In the fourth control method illustrated in FIG. 18, S501 displays a projection image for far distance.

S502 determines whether there is any projector that is determined as having a viewer in its boundary. More specifically, the distance detector 311 of the sound signal controller 31 determines, for each one of the sound pressure levels of the sound signals that are collected at the microphones 22 of the projectors 2 (projectors 201, 202, . . . ), whether the sound pressure level of the sound signal is equal to or greater than the sound pressure threshold. When it is determined that the sound pressure level is equal to or greater than the sound pressure threshold for at least one of the projectors 2 ("YES" at S502), the operation proceeds to S503. When it is determined that there is no projector having a viewer within its boundary ("NO" at S502), the operation returns to S501.

At S503, the location determiner 313 estimates a location of the viewer, based on the location information such as the angle of the sound source with respect to each one of the projectors 2. Based on the estimated location, the image selector 301 selects one of the projectors 2 that is closest to the viewer.

At S504, the image signal controller 32 causes the selected projector 2 to display a projection image for near-distance.

At S505, the projector control device 3 determines whether an instruction for turning off the power is received. When the instruction for turning off the power is received ("YES" at S505), the operation ends. Otherwise ("NO" at S505), the operation returns to S502.

S502 to S504 are repeated as long as the viewer's presence is detected. For example, referring to FIG. 15, as the viewer PA moves from (1) to (2), the projector control device 3 switches a projector 2 to display a projection image, from the projector 201 to the projector 202, when it is determined that the viewer is closest to the projector 202 based on the location information. More specifically, the projector 2 to display is switched based on the angle of the sound source with respect to the projector 2 that is detected by the angle detector 312.

In the fifth control method illustrated in FIG. 19, S601 displays a projection image for far distance.

S602 determines whether there is any projector that is determined as having a viewer within its boundary, in a substantially similar manner as described above referring to S502. When it is determined that the sound pressure level is equal to or greater than the sound pressure threshold for at least one of the projectors 2 ("YES" at S602), the operation proceeds to S603. When it is determined that there is no projector having a viewer within its boundary ("NO" at S602), the operation returns to S601.

At S603, the location determiner 313 estimates a location of the viewer, based on the location information such as the angle of the sound source with respect to each one of the projectors 2.

At S604, the output image determiner 322 combines a plurality of projection images into one large-size image for display by the near-distance projectors 2.

At S605, the image signal controller 32 causes one or more projectors 2, which are near distance, to together display the combined projection image. S606 is performed in a substantially similar manner as described above referring to S505.

As described above, the multi-projection system detects the human presence using the sounds originated from a sound source that is determined to be a human, in alternative to capturing of an image using a camera. This improves the accuracy in detection, as there is no issue of blind spot. Based on the detected location of the human relative to each of the projectors, the multi-projection system changes a layout of a projection image to be displayed on a screen, such as by changing a projector to display or a display portion of the projection image being displayed. With this configuration, a projection image is displayed on the screen such that the viewer can easily see content of the projection image.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

For example, the above-described multi-projection system may be implemented by any number of servers, which may operate in cooperation to perform the above-described operation.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The invention claimed is:

1. An apparatus configured to control a plurality of projectors, comprising:
    a memory having computer-readable instructions stored therein; and
    a processor configured to execute the computer-readable instructions to,
        receive a sound signal representing sounds originated from a sound source for each one of the plurality of projectors, the sounds being collected at each one of a plurality of microphones that are associated with the plurality of projectors,
        generate, for each one of the plurality of projectors, distance information indicating a distance of the sound source relative to a corresponding one of the plurality of projectors using the sound signal,
        detect an angle of the sound source relative to each one of the plurality of projectors using the sound signal,
        determine a layout of a projection image to be displayed by at least one of the plurality of projectors, based on at least one of the distance information and the detected angles, and
        enable the at least one of the plurality of projectors to display the projection image based on the determined layout of the projection image.

2. The apparatus of claim 1, wherein
    the distance information indicates that the sound source is at a relatively near distance from the at least one of the plurality of projectors when a sound pressure level of the sound signal is equal to or greater than a threshold, and
    the distance information indicates that the sound source is at a relatively far distance from the at least one of the plurality of projectors when the sound pressure level of the sound signal is less than the threshold.

3. The apparatus of claim 2, wherein, in order to enable the at least one of the plurality of projectors to display the projection image, the processor is further configured to,
    instruct the at least one of the plurality of projectors to display the projection image when the distance information indicates that the sound source is at the relatively near distance, and
    instruct all of the plurality of projectors to display the projection image, when the distance information indicates that the sound source is relatively far from all of the plurality of projectors.

4. The apparatus of claim 2, wherein
    the processor is further configured to,
        determine a location of the sound source based on the distance information and the detected angle, and
        select the at least one of the plurality of projectors to display a projection image based on the determined location of the sound source.

5. The apparatus of claim 4, wherein the processor is further configured to control a timing to switch the selected projector to display the projection image based on the determined location of the sound source.

6. The apparatus of claim 3, wherein, the processor is configured to instruct the plurality of projectors to generate and display one projection image by combining a plurality of projection images each having a size capable of being displayed by one projector, when the selected projector includes all of the plurality of projectors.

7. The apparatus of claim 3, wherein the processor is configured to instruct each one of the plurality of projectors to display one of a plurality of projections images each one of the plurality of projection images being generated by dividing the projection image and having a size capable of being displayed by all of the plurality of projectors, when the selected projector includes all of the plurality of projectors.

8. The apparatus of claim 4, wherein the processor is configured to select a closest one of the plurality of projectors to the sound source to display the projection image, the selection being based on the detected angles.

9. A projection system, comprising:
the apparatus of claim 1; and
the plurality of projectors configured to be connected to the apparatus through a network.

10. A method of controlling a plurality of projectors, comprising:
receiving a sound signal representing sounds originated from a sound source for each one of the plurality of projectors, the sounds being collected at each one of a plurality of microphones that are associated with the plurality of projectors;
generating, for each one of the plurality or projectors, distance information indicating a distance of the sound source relative to a corresponding one of the plurality of projectors using the sound signal;
detecting an angle of the sound source relative to each one of the plurality of projectors using the sound signal;
determining a layout of a projection image to be displayed by at least one of the plurality of projectors, based on at least one of the distance information and the detected angles; and
enabling the at least one of the plurality of projectors to display the projection image based on the determined layout of the projection image.

11. The method of claim 10, further comprising:
comparing a sound pressure level of the sound signal with a threshold for each one of the plurality of projectors,
determining that the sound source is at a relatively near distance from the at least one of the plurality of projectors when the sound pressure level of the sound signal is equal to or greater than the threshold, and
determining that the sound source is at a relatively far distance from the at least one of the plurality of projectors when the sound pressure level is less than the threshold.

12. The method of claim 11, wherein the enabling enables the displaying of the projection image by,
instructing the at least one of the plurality of projectors to display the projection image when the sound source is at the relatively near distance from the at least one of the plurality of projectors, and
instructing all of the plurality of projectors to display the projection image when the sound source is relatively far from all of the plurality of projectors.

13. The method of claim 12, further comprising:
determining a location of the sound source based on the distance information and the detected angle; and
selecting the at least one of the plurality of projectors to display a projection image based on the determined location of the sound source.

14. The method of claim 13, further comprising:
controlling a timing to switch the selected projector to display the projection image based on the determined location of the sound source.

15. The method of claim 12, further comprising:
instructing the plurality of projectors to generate and display one projection image by combining a plurality of projection images each having a size capable of being displayed by one projector, when the selected projector includes all of the plurality of projectors.

16. The method of claim 12, further comprising:
instructing each one of the plurality of projectors to display one of a plurality of projection images each one of the plurality of projection images being generated by dividing the projection image and having a size capable of being displayed by all of the plurality of projectors, when the selected projector includes all of the plurality of projectors.

17. A non-transitory computer readable medium having computer readable instructions stored therein which when executed by a processor cause the processor to control a plurality of projectors to:
receive a sound signal representing sounds originated from a sound source for each one of the plurality of projectors, the sounds being collected at each one of a plurality of microphones that are associated with the plurality of projectors;
generate, for each one of the plurality or projectors, distance information indicating a distance of the sound source relative to a corresponding one of the plurality of projectors using the sound signal;
detect an angle of the sound source relative to each one of the plurality of projectors using the sound signal;
determine a layout of the projection image to be displayed by the at least one of the plurality of projectors, based on at least one of the distance information and the detected angles; and
enable the at least one of the plurality of projectors to display the projection image based on the determined layout of the projection image.

* * * * *